(12) United States Patent
Seto et al.

(10) Patent No.: US 12,437,499 B1
(45) Date of Patent: Oct. 7, 2025

(54) COLOR CONTRASTING IMAGE MODIFICATION BASED ON ENHANCED COLOR SPACES

(71) Applicant: Meta Platforms, Inc., Menlo Park, CA (US)

(72) Inventors: Ashley Seto, San Francisco, CA (US); Xiaolu Xu, San Mateo, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 457 days.

(21) Appl. No.: 17/938,181

(22) Filed: Oct. 5, 2022

(51) Int. Cl.
| | | |
|---|---|---|
| *G06T 7/90* | (2017.01) | |
| *G06T 5/94* | (2024.01) | |
| *G06T 7/70* | (2017.01) | |
| *G06V 10/56* | (2022.01) | |
| *G06V 10/764* | (2022.01) | |

(52) U.S. Cl.
CPC ............... *G06V 10/56* (2022.01); *G06T 5/94* (2024.01); *G06T 7/70* (2017.01); *G06T 7/90* (2017.01); *G06V 10/764* (2022.01); *G06T 2207/10024* (2013.01)

(58) Field of Classification Search
CPC ........ G06V 10/56; G06V 10/764; G06T 5/94; G06T 7/70; G06T 7/90; G06T 2207/10024
USPC ........................................................ 382/167
See application file for complete search history.

(56) References Cited

U.S. PATENT DOCUMENTS

| | | | |
|---|---|---|---|
| 4,203,671 A | 5/1980 | Takahashi et al. | |
| 7,899,265 B1* | 3/2011 | Rostami | ............... G06T 11/001 382/254 |
| 2010/0321400 A1* | 12/2010 | Miyahara | ............... G09G 5/028 345/600 |
| 2012/0113441 A1* | 5/2012 | Hama | ................... H04N 1/6058 358/1.9 |
| 2012/0201450 A1* | 8/2012 | Bryant | ..................... H04N 1/62 382/162 |
| 2015/0106755 A1* | 4/2015 | Moore | .................. G06F 40/106 715/765 |
| 2017/0329943 A1* | 11/2017 | Choi | ................... H04L 63/0428 |
| 2019/0114813 A1 | 4/2019 | Belkin et al. | |
| 2020/0159871 A1* | 5/2020 | Bowen | .................... G06T 11/60 |

(Continued)

OTHER PUBLICATIONS

Ardov A., "Huetone," [Retrieved on Nov. 3, 2022], 1 page, Retrieved from the Internet: URL: https://huetone.ardov.me/.

(Continued)

*Primary Examiner* — Ali Bayat
(74) *Attorney, Agent, or Firm* — EVERSHEDS SUTHERLAND (US) LLP

(57) ABSTRACT

Systems, apparatuses and methods provide technology that identifies a first color for an area, adjusts a first color space of the first color to a second color space when a predetermined condition is met, identifies a second color of text that is to overlay the area and adjusts one or more of the first color or the second color so that a contrast ratio between the first and second colors meets a threshold contrast value. The technology further modifies an original image to include the text overlaid on the area to generate an adjusted image, where the one or more of the text and the area in the adjusted image includes the adjusted one or more of the first color or the second color, and transmits the adjusted image to a user device to be displayed.

16 Claims, 17 Drawing Sheets
(9 of 17 Drawing Sheet(s) Filed in Color)

(56) References Cited

U.S. PATENT DOCUMENTS

2022/0343561 A1\* 10/2022 Aggarwal ................. G06T 7/90
2022/0405988 A1\* 12/2022 Echevarria Vallespi .....................
                                  G06T 11/60

OTHER PUBLICATIONS

Lea Verou, "LCH Colors in CSS: What, Why, and How?," Apr. 4, 2020, [Retrieved on Nov. 3, 2022], 12 pages, Retrieved from the Internet: URL: https://lea.verou.me/2020/04/lch-colors-in-css-what-why-and-how/.

MDN, "Color—CSS: Cascading Style Sheets," [Retrieved on Nov. 3, 2022], 12 pages, Retrieved from the Internet: URL: https://developer.mozilla.org/en-US/docs/Web/CSS/color_value.

Sciences-Po, "I Want Hue," Medialab, [Retrieved on Nov. 3, 2022], 15 pages, Retrieved from the Internet: URL: http://medialab.github.io/iwanthue/theory/.

Wikipedia: "CIELAB Color Space," [Retrieved on Nov. 3, 2022], 11 pages, Retrieved from the Internet: URL: https://en.wikipedia.org/wiki/CIELAB_color_space.

Wikipedia: "CIELUV," [Retrieved on Nov. 3, 2022], 5 pages, Retrieved from the Internet: URL: https://en.wikipedia.org/wiki/CIELUV.

Wikipedia: "HSL and HSV," [Retrieved on Nov. 3, 2022], 22 pages, Retrieved from the Internet: URL: https://en.wikipedia.org/wiki/HSL_and_HSV.

Wikipedia: "Munsell Color System," [Retrieved on Nov. 3, 2022], 8 pages, Retrieved from the Internet: URL: https://en.wikipedia.org/wiki/Munsell_color_system.

\* cited by examiner

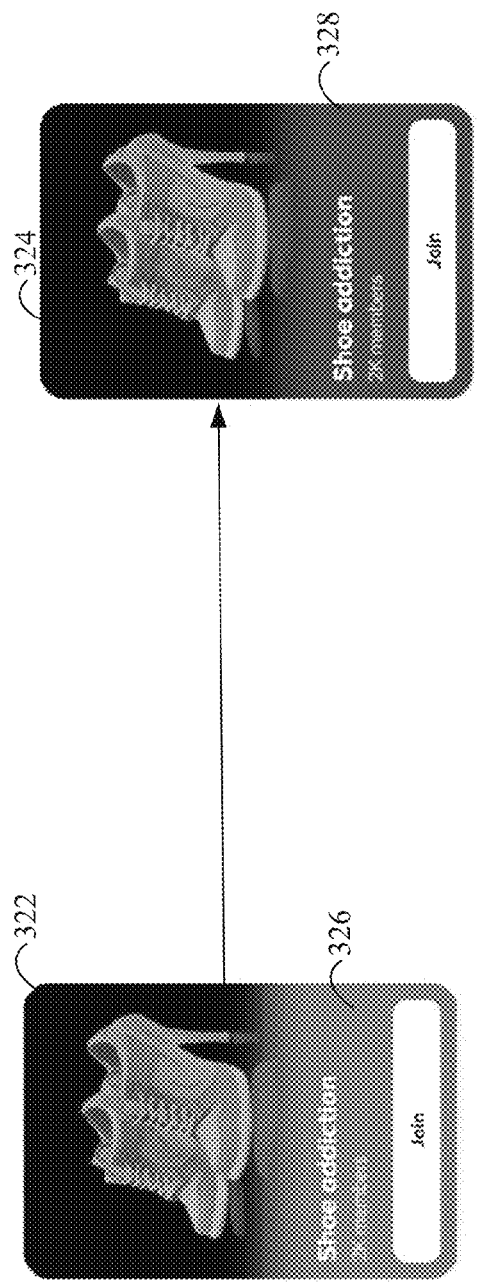
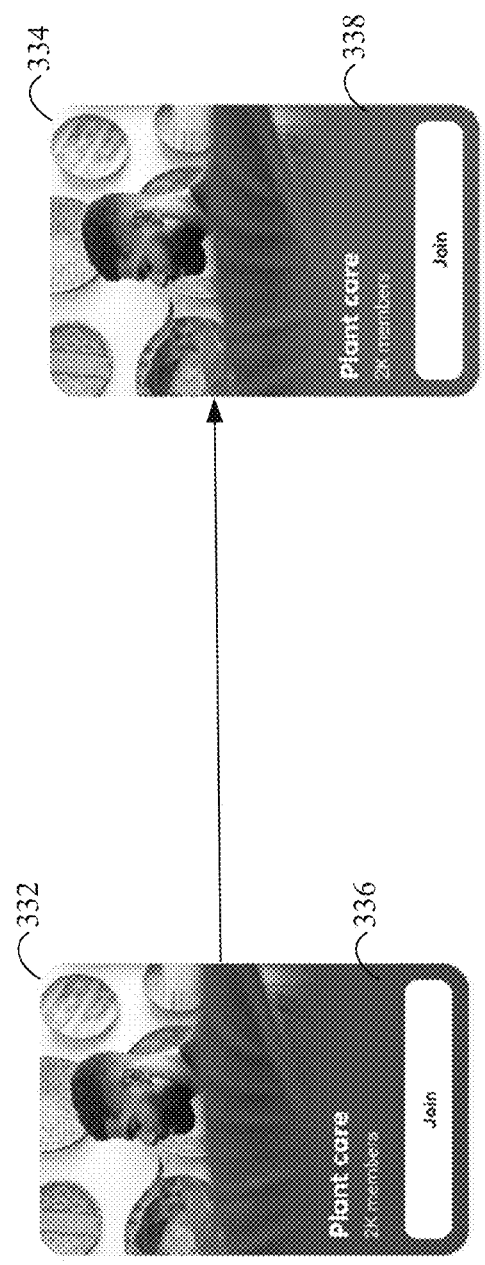
FIG. 5C
FIG. 5D

COLOR CONTRASTING IMAGE MODIFICATION BASED ON ENHANCED COLOR SPACES

TECHNICAL FIELD

Examples of the disclosure generally relate to image modifications. More specifically, examples relate to systems, apparatuses and methods for modifying images to include attractive colors that meet a specific contrast ratio.

BACKGROUND

Users of an online system, such as a social network site, are often presented with a large number of different types of content. For example, the user of a social network site may view a newsfeed containing posts or status updates by other users, various types of content shared by other users (e.g., images, video, links, and/or the like), sponsored content, etc.

Certain types of content may be displayed to the user as an image, which the user can view and/or click on to access the content. Different types of formatting may be used when displaying content items, allowing the user to more easily differentiate between certain types of content items, or to draw the user's eyes to certain types of content items.

SUMMARY

Some examples include at least one computer readable storage medium comprising a set of instructions, which when executed by a computing device, cause the computing device to identify a first color for an area, adjust a first color space of the first color to a second color space when a predetermined condition is met and identify a second color of text that is to overlay the area. Such examples further adjust one or more of the first color or the second color so that a contrast ratio between the first and second colors approaches a threshold contrast value, and modify an original image to include the text overlaid on the area to generate an adjusted image, wherein the one or more of the text and the area in the adjusted image includes the adjusted one or more of the first color or the second color.

Some examples include a system comprising one or more processors, and a memory coupled to the one or more processors. The memory comprises instructions executable by the one or more processors, the one or more processors being operable when executing the instructions to identify a first color for an area, adjust a first color space of the first color to a second color space when a predetermined condition is met and identify a second color of text that is to overlay the area. In such examples, the one or more processors further adjust one or more of the first color or the second color so that a contrast ratio between the first and second colors approaches a threshold contrast value and modify an original image to include the text overlaid on the area to generate an adjusted image, wherein the one or more of the text and the area in the adjusted image includes the adjusted one or more of the first color or the second color.

Some examples include a method comprising identifying a first color for an area, adjusting a first color space of the first color to a second color space when a predetermined condition is met, and identify a second color of text that is to overlay the area. Such examples further include adjusting one or more of the first color or the second color so that a contrast ratio between the first and second colors approaches a threshold contrast value, and modifying an original image to include the text overlaid on the area to generate an adjusted image, wherein the one or more of the text and the area in the adjusted image includes the adjusted one or more of the first color or the second color.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The various advantages of the examples will become apparent to one skilled in the art by reading the following specification and appended claims, and by referencing the following drawings, in which:

FIGS. 5A, 5B, 5C and 5D illustrate examples of conventional modifications according to conventional implementations and exemplary modifications according to examples of the disclosure;

DESCRIPTION EXAMPLE

Figure 1:
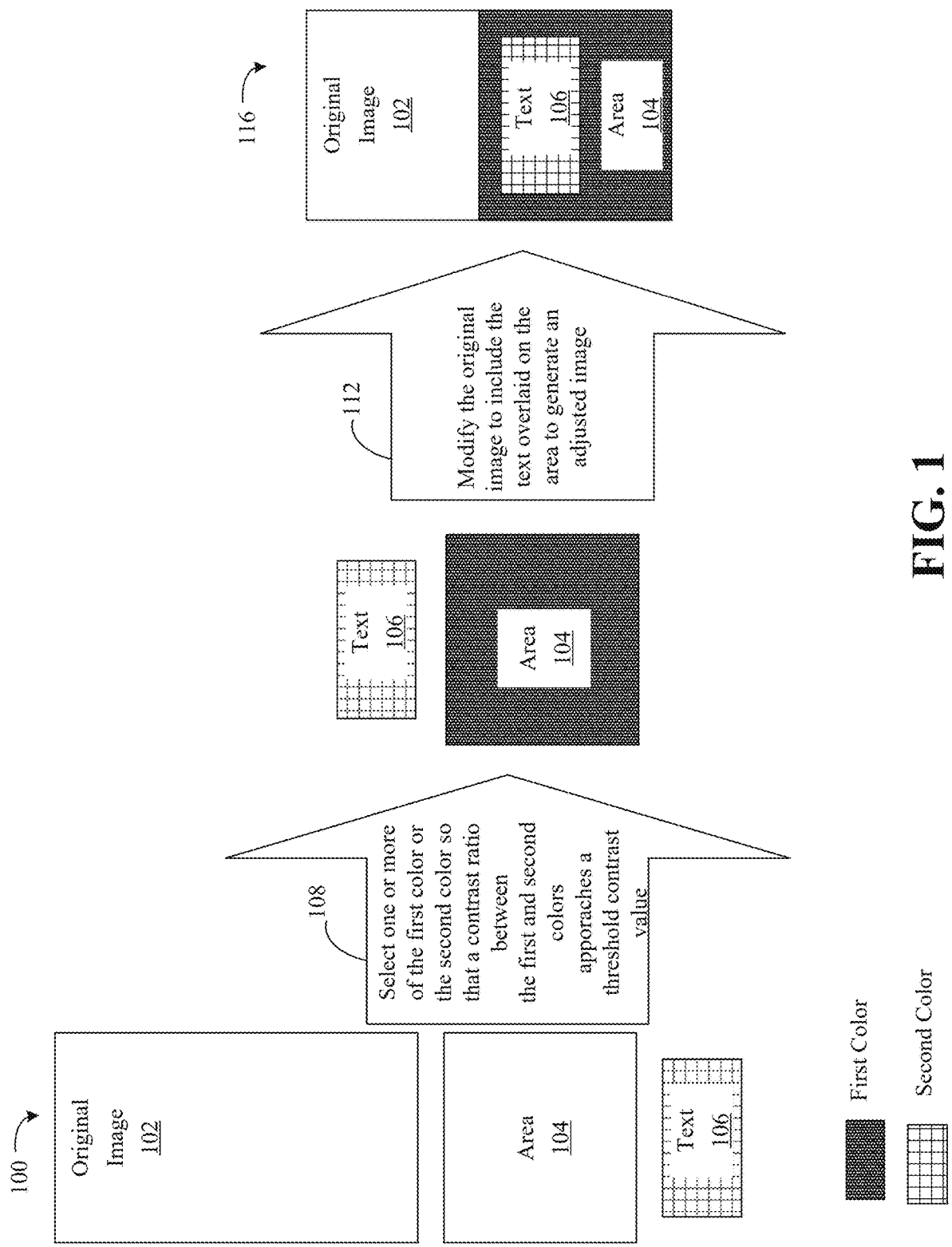
FIG. 1 is a process of an example of an image adjustment process according to an example of the disclosure.

Examples of the disclosure relate to an item presentation system that is able to generate contrast-enhanced items so that a wide variety of users are able to discern content of the items. For example, some examples modify the colors of one or more of text or underlying areas of the text so that the content (text) is accessible to a wide variety of people, including those with sensory challenges (e.g., low vision). For example, the contrast between the text and the underlying area may be modified to enhance the contrast ratio between the text and the underlying areas. In doing so, the text may be more easily discernible. Further, the colors of the text and the underlying areas may be selected in an intelligent manner to avoid certain colors (e.g., unattractive colors) that may detract from the overall image presentation and draw attention away from focal points of the image. Thus, examples may select attractive colors that draw attention towards focal points of the image while achieving a contrast ratio that facilitates accessibility to meet the needs of a wide variety of users (e.g., vision-challenged individuals).

Examples may further operate in color spaces (e.g., a L*a*b* color space or a Hue-Chroma-Lightness color space) that are efficient for adjustment. That is, some examples may adjust the color space of images and/or colors of the image to modify the colors to achieve a desired contrast ratio. Some examples may also adjust the chroma and lightness of the color (e.g., to lighten or darken the color) to achieve the contrast ratio. Examples may also exclude exclusion colors (e.g., unattractive colors, human skin tones, etc.) to enhance the attractiveness of images, and avoid unwarranted bias implications. In the event that a color cannot be selected or adjusted to meet the contrast ratio, some examples will default to a specific color (e.g., black) to avoid failures. Some examples may also avoid selecting complementary colors that are complementary to dominant color(s) in an image. Doing so enhances the overall appearance of images.

In contrast, conventional examples may operate in color spaces (e.g., hue, saturation, value color space, standard RGB color space, etc.) which makes it more difficult to adjust a color (e.g., only darkens) to achieve a desired contrast ratio while maintaining the color as part of a same color family, since chroma and lightness cannot be readily individually adjusted. For example, in the RGB color space, there is not one variable to adjust lightness, so it is much harder to modify just the brightness of a color. In the HSL color spaces there does exist one variable (lightness variable) that may adjust the lightness, but the meaning and modification of that lightness will vary greatly between hues making adjustments inconsistent across hues. Furthermore, conventional examples may select unattractive colors, complementary colors and have higher failure rates (where a color cannot be selected to meet a contrast ratio) relative to examples as described herein. Thus, conventional examples are less efficient and cannot achieve the aforementioned success rate of present examples. As such, examples described herein implement new computer functionality with enhanced success rates to achieve accessibility standards.

FIG. 1 illustrates an image adjustment process 100. The process 100 may be implemented in a computing architecture. For example, the process 100 may be implemented in a computing device including a memory and processor, computing system (e.g., hardware, configurable logic, fixed-function logic hardware, at least one computer readable storage medium comprising a set of instructions for execution, etc.).

An original image 102, area 104 and text 106 are provided. The original image 102 will be modified by including the area 104 underlying the text 106. The text 106 may be informative content relating to a description of the image 102 or other information (e.g., link, warnings, etc.). Thus, the text 106 may be displayed on the image 102. In order to increase visibility, the area 104 may be underlie the text 106 to increase a contrast ratio of the text 106. For example, a contrast ratio of the original image 102 and the text 106 may be too low, hindering the legibility of the text 106. Thus, the area 104 may be provided to increase the contrast ratio between the text 106 and the area 104 to meet a threshold. The area 104 may also increase the attractiveness, appeal and prominence of the text 106 by providing an eye catching color underlying the text 106.

In order to achieve the above, a first color of the area 104 is selected. In some examples, the color of the area 104 may be extracted from the original image 102 or may be generated based on colors in the original image 102. For example, the area 104 may not be part of the original image 102 and may thus be generated. It will be understood however that in some examples, the area 104 may be part of the original image 102 and is identified as being an underlay for the text 106.

In some examples, the color of the area 104 may be adjusted and/or selected based on a cascading set of criteria: 1) Prioritization of high chroma (chroma may be a color's purity, intensity or saturation) colors, 2) Prioritization of a percentage of a color in the original image 102, 3) Only evaluate lower chroma colors when there is a large percentage of lower chroma colors in the original image 102 or higher chroma selection has failed, 4) Avoid some exclusion colors (e.g., orange, yellow, generally unpleasing colors) unless no other color can be found, 5) Never select other types of exclusion colors (e.g., a skin tone) to be the returned first color for the area 104. While the first color of the area 104 is shown as being selected, it will be understood that the first color of the area 104 may be adjusted based on the above.

In detail, some examples may select high chroma colors (e.g., pure from any presence of gray and white, or brighter, colors having chroma values above a chroma threshold). That is, colors having a chroma value that meets a threshold (e.g., 50 or greater) may be preferred or prioritized for color selection rather than lower chroma colors.

Some examples may also prioritize color families that form a percentage of a color in the original image 102 (e.g., are the most common color in the image). For example, if the percentage of colors (which are from a same color family) in the original image 102 meets a threshold (e.g., are the highest number, colors from the same color family are prioritized. As a more detailed example, if a percentage of color in original image 102 is from the pink color family, colors from the pink family may be prioritized for selection for the area 104.

Some examples further only evaluate lower chroma colors (e.g., darker colors, colors having chroma values at or below the chroma threshold) when a large percentage of lower chroma colors are present in the original image 102 or higher chroma selection has failed (e.g., is unable to meet the contrast ratio). For example, if the percentage of lower chroma colors meets a threshold, then lower chroma colors may be prioritized as the color of the area 104. A lower chroma color may have a chroma value that is lower than a threshold (e.g., 15 or lower). Higher chroma selection may fail when a contrast ratio with the text 106 cannot be achieved. For example, a high chroma color may result in the contrast ratio between the high chroma color and the second color of the text being either too great or too large (is not within a predetermined range of the threshold contrast ratio).

Examples may also avoid certain exclusion colors (e.g., orange, yellow, generally unpleasing colors) unless no other color can be found (discussed below in greater detail). Examples may also always avoid selecting a skin tone to be as the returned color for the area 104. If no color cannot be identified based on the above, a default color (e.g., black) may be selected as the first color.

In some examples, a first color of the area 104 may be selected to exclude any colors that are in an exclusion list of colors. For example, the exclusion list of colors includes a predetermined set of colors (e.g., flesh colors, unattractive colors, etc.) that are to be excluded as forming the area 104. Thus, the process 100 may first determine whether the first color of the area 104 is a color that is in the exclusion list, and if so, modify the first color to avoid being in the exclusion list. The text 106 may be a second color, and may be modified similar to the above.

In some examples, a first color space of the selected color of the area 104 may be adjusted to a second color space when a predetermined condition is met. The predetermined condition may be the first color space being in a limited space format or failing to include a defined color component (e.g., chroma or lightness). For example, in order to generate a specific ranges of values, examples may need to identify a color space for the values to exist within.

Figure 7A:
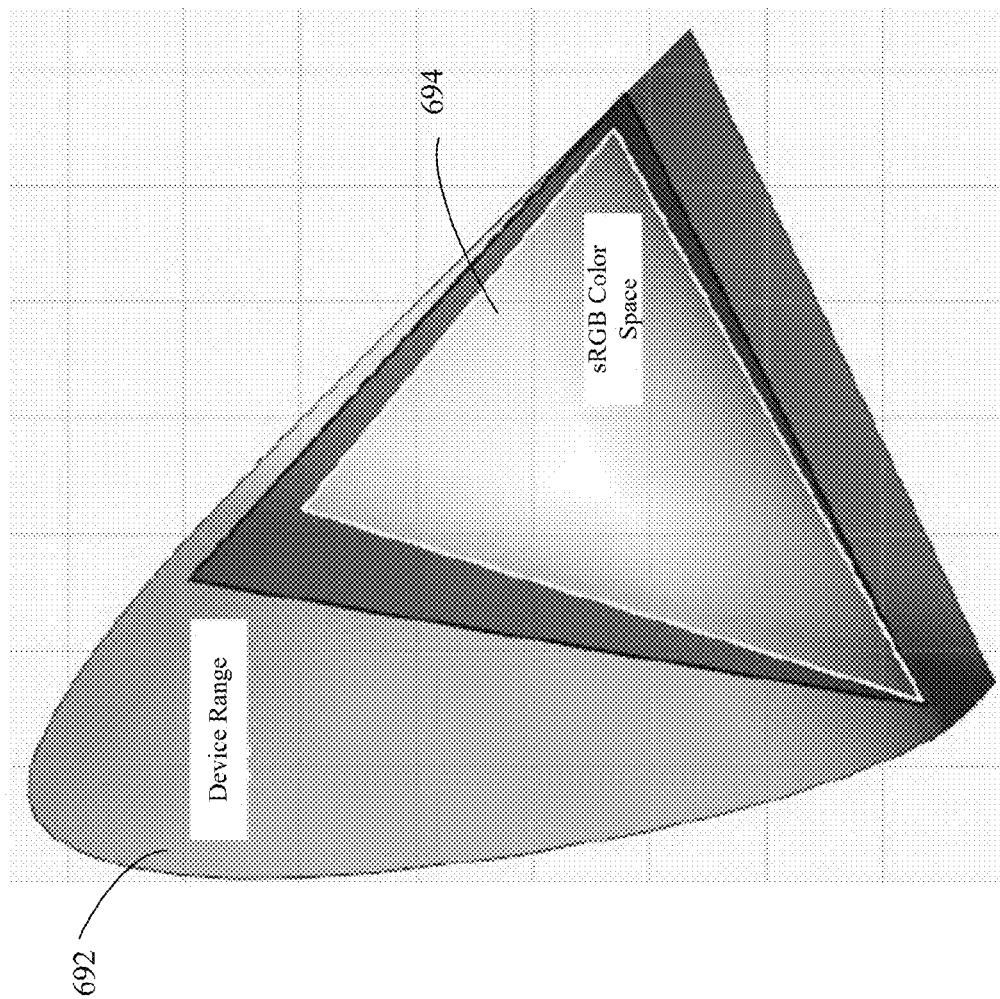
FIG. 7A illustrate examples of color spaces.

FIG. 7A illustrates color spaces 690. For example, a standard RGB (red, green, blue) color space 694 (sRGB) is at present, a commonly defined color space for design and hardware devices. The sRGB color space 694 is limited in the number of colors that are able to be represented and vastly underutilizes the display potential of many hardware devices (e.g., P3 devices) resulting in inefficient resource usage and dull color presentations. The hardware devices may employ a wide color gamut and may be used extensively in mobile devices, as opposed to sRGB which lacks the richly saturated red and green colors represented in the hardware devices. In some examples, a hue, saturation, value (HSV) color space may be used.

A hue, saturation, lightness (HSL) color space may be more intuitive to operate within as compared to the sRGB color space 694. Moreover, the HSL color space has gained acceptance for the ability of the HSL color space to smooth 100% to 0% opacity gradients without banding. An example of not observing banding would be a smooth transition between colors where a user cannot observe or view any obvious breaks in the color transitions. An example of banding is when a user observes lines in the color transitions where the transition is not smooth in a gradient. HSL may include lightness and saturation components that may however omit the human perception of colors. For example, when comparing two colors of equal hue with the same saturation and lightness, such colors may not appear visually similar on different devices. For example, not all devices are able to render the same color space because not all devices support all color spaces (e.g., a television versus mobile device). There will be conversions made by those devices or approximate renderings of those colors. Doing so may make it difficult to create color families and meet accessibility requirements. Further, when considering gradients, HSL may "gray out" as colors may blend together.

A CIELAB color space, also referred to as L*a*b* (LAB) is based on a human perception of color so the LAB color space visually operates ideally with the human eye compared to other models not using the LAB color space and may presented similarly on different devices. The LAB color space expresses color as three values: L* for perceptual lightness, and a* and b* for the four unique colors of human vision: red, green, blue, and yellow. For example, an a* axis describes the green-red opponent colors, with negative values toward green and positive values toward red. The b* axis describes the blue-yellow opponents, with negative numbers toward blue and positive toward yellow. The LAB color space may seamlessly operate with many hardware devices (e.g., P3 devices). The LAB color space may not be as intuitive as other color spaces however, and may have some specific drawbacks with the specific colors (e.g., blue) and how the specific color changes as values shift.

A Hue-Chroma-Lightness (or luminance) color space (ICH/LCH/HCL, referred to as LCH below) may also be considered. The LCH color space combines the multiple advantageous aspects referenced above allowing color to be considered from a human eye perception (e.g., L coming from LAB) and how to approach with and consider a color (e.g., C and H, although H is slightly different from HSL). LCH should also operate with most hardware devices including P3 devices. Colors may be categorized based on the following Table I in the LCH/HCL color space due to the way the color space attempts to account for the human perception of color

TABLE I

| Colorfulness | Lightness | Chroma |
| --- | --- | --- |
| High | >=30 | >=50 |
| Med | >=30 | >=25 |
| Low | >=15 | >=15 |
| Lowest | >=50 | 7-14 |

As noted above, high chroma colors are defined as having chroma above or equal to 50 (and potentially chroma above or equal to 25), and low chroma is considered to be chroma being less than or equal to 15 (and potentially in some examples having chroma lower than 25). In some examples, in a failure to extract a color, the algorithm will select black.

Examples may first transform the color from a first color space (e.g., sRGB color space) to a second color space (e.g., the LCH color space) when the first color is not in the second color space (e.g., LCH color space. For example, the first color may be identified from the original image 102. The original image may not be in the LCH color space but may in the sRGB color space. Thus, the extracted color is first converted to the LCH color space when the color is identified as originally not being in the LCH color space. When using the LCH color space, examples may adjust just the L (lightness), values without changing the hue or color family of the selected input color. Once in the LCH color space, examples generate new colors of increasing lightness (for colors that start off too dark), or new colors of decreasing lightness (for colors that start off too light) until a color that matches the target contrast ratio as closely as possible is identified. Thus, the target contrast ratio may not be met, but the final contrast ratio between the first color and the second color may be adjusted to be as proximate as possible to the target contrast ratio. If the final contrast ratio is not within a predetermined range of the target contrast ratio, the final contrast ratio may be deemed unacceptable and a default color (e.g., black) is selected.

Skin values in the LCH color space may be identified based on table II below and form the exclusion list. Examples may reference Table II below to identify colors that are to be excluded and adjust accordingly.

TABLE II

| Hue | Chroma | Lightness |
| --- | --- | --- |
| 92 | ≤55 | |
| 91 | ≤55 | |
| 90 | ≤55 | |
| 89 | ≤60 | |
| 88 | ≤65 | |
| 87 | ≤65 | |

TABLE II-continued

| Hue | Chroma | Lightness |
|---|---|---|
| 86 | ≤70 | |
| 85 | ≤70 | |
| 84 | ≤70 | |
| 83 | ≤70 | |
| 82 | ≤75 | |
| 81 | ≤75 | |
| 80 | ≤75 | |
| 79 | ≤75 | |
| 78 | ≤75 | |
| 77 | All | |
| 76 | All | |
| 75 | All | |
| 74 | All | |
| 73 | All | |
| 72 | All | |
| 71 | All | |
| 70 | All | |
| 69 | All | |
| 68 | All | |
| 67 | All | |
| 66 | All | |
| 65 | All | |
| 64 | ≤75 | |
| 63 | ≤75 | |
| 62 | ≤75 | |
| 61 | ≤75 | |
| 60 | ≤75 | |
| 59 | ≤75 | |
| 58 | ≤75 | |
| 57 | ≤75 | |
| 56 | ≤75 | |
| 55 | ≤75 | |
| 54 | ≤75 | |
| 53 | ≤75 | |
| 52 | ≤70 | |
| 51 | ≤70 | |
| 50 | ≤70 | |
| 49 | ≤70 | |
| 48 | ≤70 | |
| 47 | ≤70 | |
| 46 | ≤70 | |
| 45 | ≤65 | |
| 44 | ≤65 | |
| 43 | ≤65 | |
| 42 | ≤65 | |
| 41 | ≤65 | |
| 40 | ≤60 | |
| 39 | ≤60 | |
| 38 | ≤60 | |
| 37 | ≤60 | |
| 36 | ≤60 | |
| 35 | ≤40 | |
| 34 | ≤40 | |
| 33 | ≤40 | |
| 32 | ≤40 | |
| 31 | ≤40 | |
| 30 | ≤40 | |
| 29 | ≤40 | |
| 28 | ≤40 | |
| 27 | ≤40 | |
| 26 | ≤40 | |
| 25 | ≤35 | ≤60 |
| 24 | ≤35 | ≤60 |
| 23 | ≤35 | ≤60 |
| 22 | ≤35 | ≤60 |
| 21 | ≤35 | ≤60 |
| 20 | ≤35 | ≤60 |
| 19 | ≤30 | ≤60 |
| 18 | ≤30 | ≤60 |
| 17 | ≤30 | ≤60 |
| 16 | ≤30 | ≤60 |
| 15 | ≤25 | ≤50 |
| 14 | ≤25 | ≤50 |
| 13 | ≤25 | ≤50 |
| 12 | ≤25 | ≤50 |
| 11 | ≤25 | ≤50 |
| 10 | ≤20 | ≤50 |
| 9 | ≤20 | ≤50 |
| 8 | ≤20 | ≤50 |
| 7 | ≤20 | ≤50 |
| 6 | ≤20 | ≤50 |
| 5 | ≤20 | ≤50 |
| 4 | ≤20 | ≤50 |
| 3 | ≤20 | ≤50 |
| 2 | ≤20 | ≤50 |
| 1 | ≤20 | ≤50 |

Unattractive colors may be defined in the in the LCH color space as having values that may be identified based on Table III below and form part of the exclusion list. Examples may reference Table III below to identify colors that are to be excluded and adjust accordingly. That is, if a color falls within the boundaries of Table II, the color is excluded from the forming the area 104. Table III identifies unattractive colors.

TABLE III

| Hue | Chroma | Lightness |
|---|---|---|
| 106-97 | All | All |

Table IV below illustrates a series of cascading strategies that are ordered in priority. Thus, different strategies may be adopted depending on whether the target contrast is achievable and extracted color from the original image 102.

TABLE IV

| Strategy | Colorfulness | Percentage | Low Chroma (190-290) | Orange (H = 71-42) | Yellow (H = 96-70) | Unattractive colors | Skin |
|---|---|---|---|---|---|---|---|
| 1 | High | 2% | No | No | No | No | No |
| 2 | High | 1% | No | No | No | No | No |
| 3 | Med | .1% | No | No | No | No | No |
| 4 | Med | .1% | No | No | No | No | No |
| 5 | Lowest | 2% | Yes | No | No | No | No |
| 6 | Low | 0.5% | No | Yes | No | No | No |
| 7 | Low | 0.5% | No | Yes | Yes | No | No |
| 8 | Low | 0.5% | No | Yes | Yes | Yes | No |

In more detail with respect to FIG. 7A, the sRGB color space 694 encompasses various colors, but excludes a significant number of colors that cannot be represented in the sRGB color space 694. That is, only a small portion of device range 692 (e.g., the total colors available to present on a P3 device) are encompassed within sRGB color space 694. The total number of colors that are capable of being represented on a P3 device are illustrated as the device range 692 which encompasses the sRGB color space 694 range. A significant amount of colors in the device range 692 are outside the sRGB color space 694. Thus, utilizing the sRGB color space 694 results in significant color impairment of a device that is capable of presenting colors in the device range 692. As such, some examples utilize other colors spaces (e.g., LCH color space, LAB color space, etc.)

Figure 7B:
FIG. 7B illustrates an example of an image presented on a device.

To better visualize the above, FIG. 7B illustrates an image 658 presented on a P3 device. As shown, a first portion 654 of the image 658 is presented in the sRGB color space 694, and a second portion of the image 656 is presented in the device range 692 color space (e.g., LCH color space LAB color space, HSL color space, etc.). As illustrated, the first portion 654 is dull compared to the vibrant second portion 656. This may be attributed to the distinct color space that is used to generate the first and second portions 654, 656. That is, device range 692 (e.g., corresponds to the P3 color space) has 50% more colors than sRGB color space 694, and as consequence the second portion 656 has a deep and rich color pallet unavailable to the first portion 654.

Thus, some examples determine a color space of colors of the area 104 and/or original image 102, and whether to adjust (e.g., convert) the color space. If the color space does not correspond to a predetermined color space (e.g., LCH color space LAB color space, HSL color space, etc.), the color space may be converted to the predetermined color space. Such a situation may arise when the original image 102 and/or area 104 is in a first color space (e.g., sRGB) and a color is extracted therefrom. Examples transform the area 104 and/or the original image 102 from the first color space to a second color space (e.g., LCH color space LAB color space, HSL color space, etc.).

When the color space of the original image 102 and/or area 104 are mapped to the predetermined color space (either by being adjusted or originally being in the predetermined color space), examples may then adjust the one or more of the first color or the second color. For example, the process 100 adjusts one or more of the first color or the second color so that a contrast ratio between the first and second colors meets or approaches (or meets) a threshold contrast value 108. In detail, a lightness of the first color of the area 104 and/or the second color of the text 106 may be adjusted until the contrast ratio threshold is met or until the contrast ratio is as close as possible to the contrast ratio threshold. While lightness is described above, other adjustments to other parameters of the first and second colors may be executed to increase/decrease the contrast ratio between the first and second colors until the contrast ratio threshold is met.

As illustrated, the area 104 is now assigned the first color and has a darkness to increase the contrast ratio between the text 106 and the area 104. In doing so, the contrast ratio approaches/meets the contrast ratio threshold. The process 100 then modifies the original image 102 to include the text 106 overlaid on the area 104 to generate an adjusted image 112, 116 comprising the original image 102 with the area 104 and the text 106. As illustrated, the original image 102 underlays the area 104, and the area 104 underlays the text 106. The adjusted image 116 includes the adjusted the first color so that the contrast ratio meets between the first and second colors meets the threshold contrast value. While not illustrated, the adjusted image 116 may be transmitted (wired or wirelessly) to a user device to be displayed on the user device. Notably, the text 106 may be accessible (i.e., discerned or read) by a diverse groups of people (e.g., sensory challenged) based on the contrast ratio meeting the contrast ratio value.

Thus in some examples, after a color is extracted and/or identified from the original image 102 (e.g., a color is identified) and set as the first color for the area 104, the first color is processed to obtain a contrast ratio of 6.5 (or in some cases 4.5) with the text 106 (e.g., a white color). Such examples may be used particularly in places where text 106 would overlay (e.g., gradient overlay), and will ensure sufficient contrast to the second color (e.g., white) text to ensure that accessibility requirements are always met. Doing so would also ensure that even though the colors extracted might be different across a group units (e.g., a h-scroll unit of media cards), the color tone across the units may be consistently employed.

Figure 2:
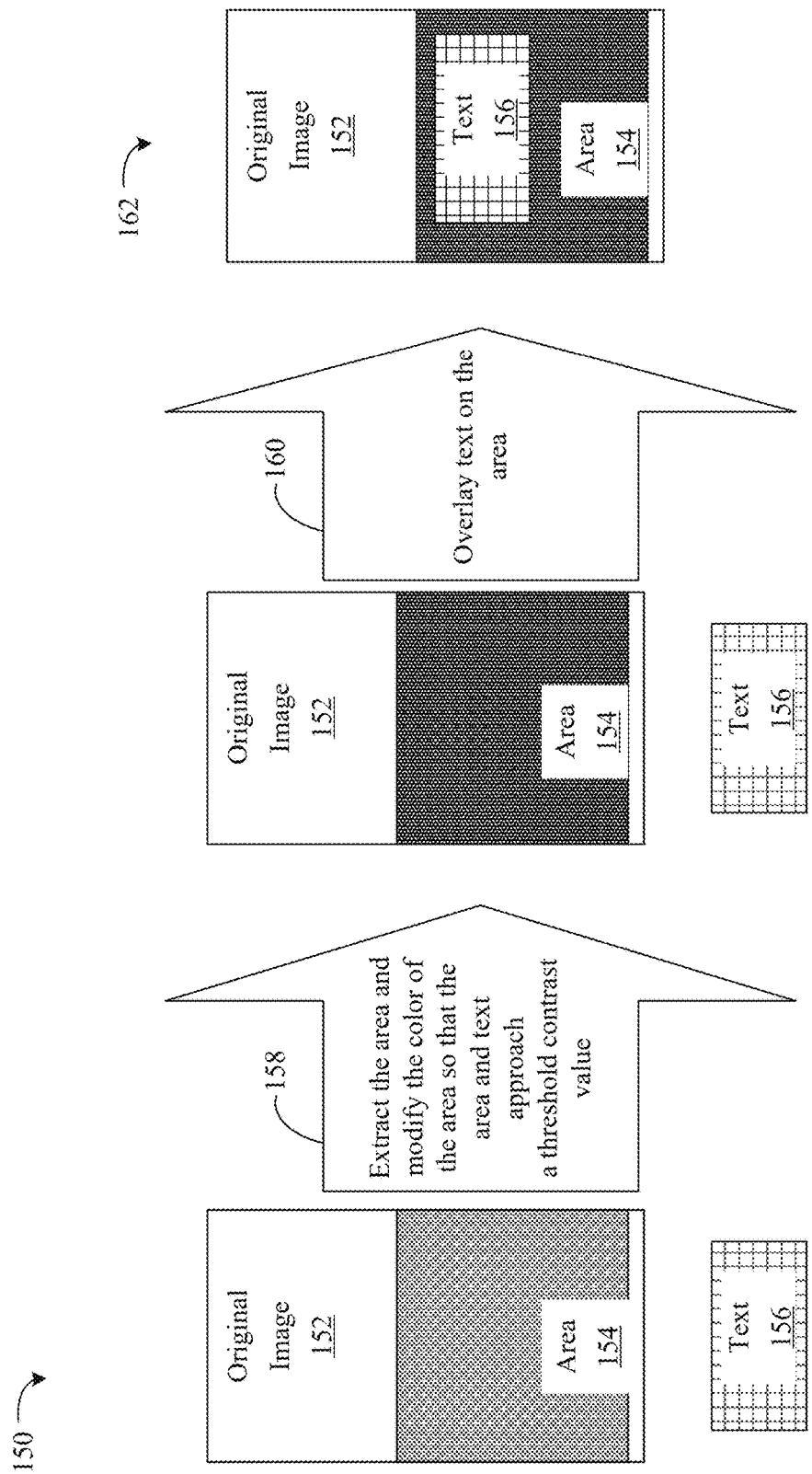
FIG. 2 is a process of an example of an image modification process according to an example of the disclosure.

FIG. 2 illustrates a modification process 150 that includes extracting an area 154 from an original image 152. The modification process 150 may generally be implemented with the examples described herein, for example, the process 100 (FIG. 1) already discussed. The modification process 140 may be implemented in a computing architecture. For example, the modification process 150 may be implemented in a computing device, computing system (e.g., hardware, configurable logic, fixed-function logic hardware, at least one computer readable storage medium comprising a set of instructions for execution, etc.).

In some examples, the original image 152 may include an area 154 that is an acceptable space to overlay text 156. Thus, rather than inserting another area that was not part of the original image 152, some examples may modify the area 154 of the original image 152. For example, the area 154 may be identified as being a candidate to underlie the text 156 based on a condition, such as the area 154 meeting a certain size, for example being larger than the text 156 by a predetermined amount and/or percentage.

The process modification 150 then extracts the area 154 (e.g., based on the condition above) from the original image 152 and modifies the color of the area 154 so that the area 154 and text 156 approach a threshold contrast value. That is, the color of the area 154 is adjusted so that the color of the area 154 and the color of the text 156 meets a threshold contrast value 158. Such a process is similar to as described above with respect to process 100 (FIG. 1). In some examples, color space of the area 154 may be adjusted to a different color space as discussed above. The modification process 150 then overlays the text 156 on the area 154, 160 to generate an adjusted image 162 comprising the original image 152, area 154 and text 156.

Figure 3:
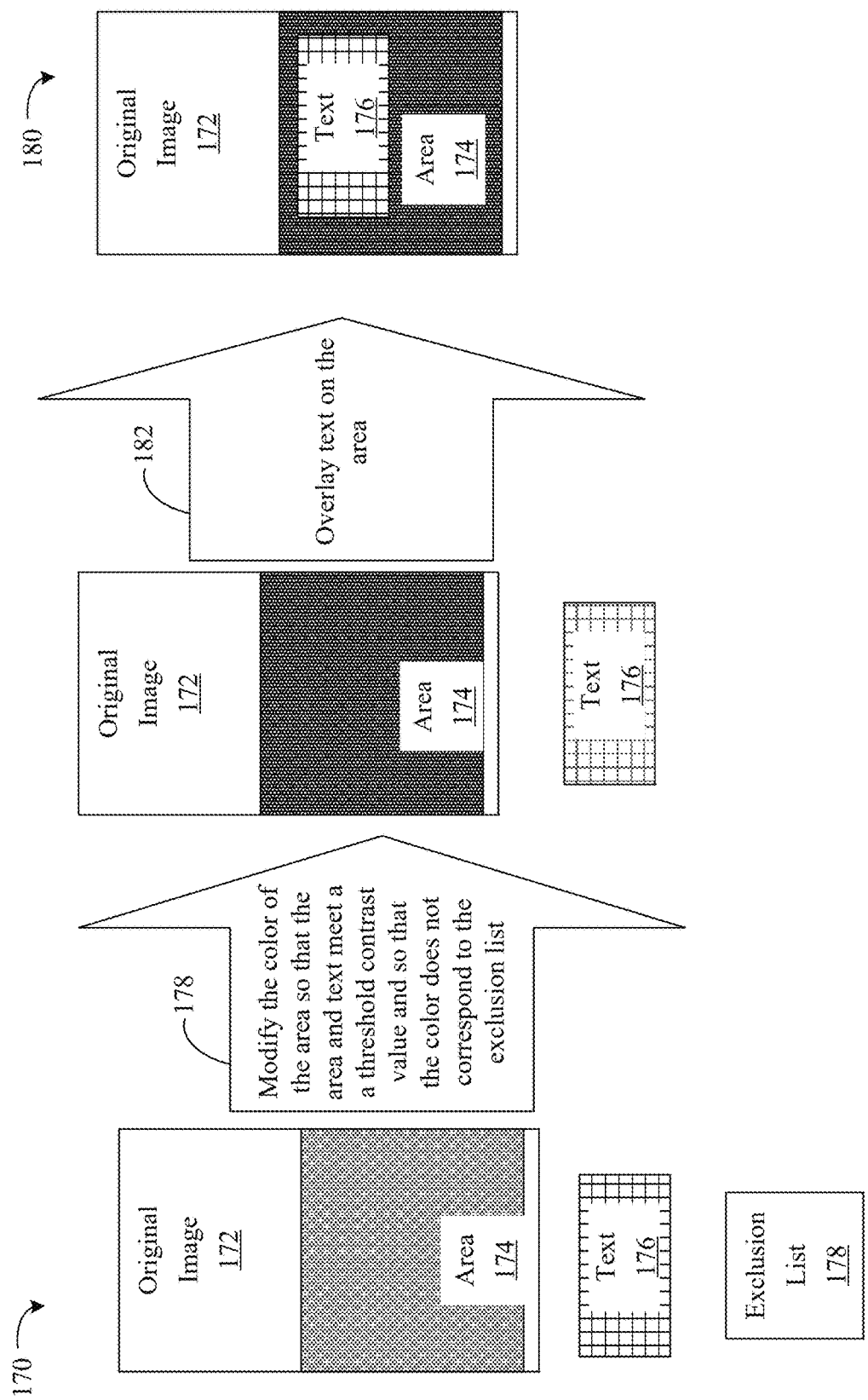
FIG. 3 is a process of an example of adjusting colors based on an exclusion list according to an example of the disclosure.

FIG. 3 illustrates a process 170 to adjust colors based on an exclusion list. The process 170 may generally be implemented with the examples described herein, for example, the process 100 (FIG. 1) and/or modification process 150 (FIG. 2) already discussed. The process 170 may be implemented in a computing architecture. For example, the process 170 may be implemented in a computing device, computing system (e.g., hardware, configurable logic, fixed-function logic hardware, at least one computer readable storage medium comprising a set of instructions for execution, etc.). The process 170 operates on an original image 172 that includes an area 174. The area 174 may be identified similarly to as above, or may be generated in some other examples. A text 176 is to overlay the area 174.

The exclusion list 178 may be generated ahead of time and include various colors that are to be excluded as serving as the color of the area 174. For example, flesh-like colors may always be avoided to bypass unwarranted implications of bias. Further, unattractive colors (e.g., dull yellow, dull green which may be colloquially referred to as "puke green") may sometimes be avoided, and only used if no other color is available to approach the target contrast ratio. That is, such unattractive colors may create a poor impression of the original image 172 and/or may result in users avoiding viewing the area 174, and text 176 overlying the area 174, to avoid viewing the unattractive colors. Such a situation may be problematic, particularly if the text 176 includes important information or is intended to convey information.

Thus, the process 170 modifies the color of the area 174 so that the area 174 and text 176 meet a threshold contrast value and so that the color of the area 174 does not correspond to the exclusion list 178. For example, process 170 identifies the exclusion list 178 of colors that are to be excluded. The process 170 identifies that a first adjustment to the one or more of a first color of the area 174 or a second color of the text 176 would result in the one or more of the first color or the second color matching (e.g., coming within a color proximity or being similar to) a color of the exclusion list 178. In response, the process 170 discards the first adjustment to avoid modifying the one or more of the first or second color to match any color on the exclusion list 178. In some examples, the process 170 identifies that a second adjustment to the one or more of the first color or the second color would result in the one or more of the first color or the second color not matching (e.g., does not come within a color proximity or is not similar to) any color in the exclusion list 178, and implements the second adjustment to adjust the one or more of the first color or the second color based on as much.

The process 170 then overlays the text 176 on the area 174, 182 to generate an adjusted image 180. The adjusted image 180 comprises original image 172, text 186 and area 174.

Figure 4:
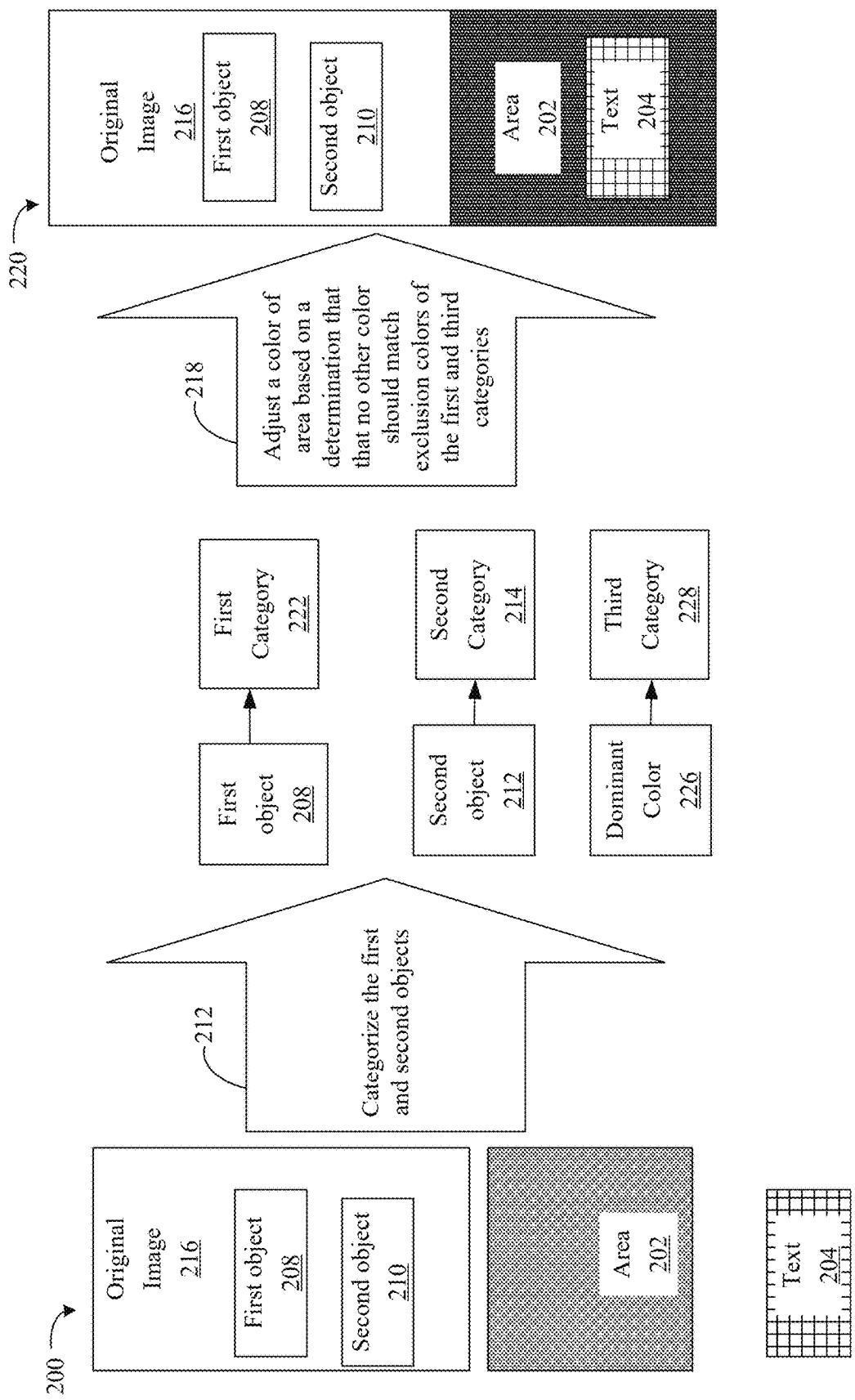
FIG. 4 is a process of an example a color selection process according to an example of the disclosure.

FIG. 4 illustrates a color selection process 200. The color selection process 200 may be implemented in a computing architecture. For example, the color selection process 200 may be implemented in a computing device, computing system (e.g., hardware, configurable logic, fixed-function logic hardware, at least one computer readable storage medium comprising a set of instructions for execution, etc.). The color selection process 200 may generally be implemented with the examples described herein, for example, the process 100 (FIG. 1), modification process 150 (FIG. 2) and/or process 170 (FIG. 3) already discussed.

The color selection process 200 modifies an area 202. The area 202 may be generated or extracted from the original image 216. In this example, the original image 216 may be analyzed (e.g., using image recognition) to identify various objects, including the first object 208 and the second object 210, in the original image 216. Moreover, the original image 216 may be analyzed to detect various colors in the image 216, including a dominant color (e.g., a color that is a focal point or appears the most often from all colors).

Once the first object 208 and the second object 210 have been identified from the original image 216, the color selection process 200 then categorizes the first and second objects 208, 210, 212. The first object 208 is categorized as being in a first category 222, while the second object 210 is categorized as being in the second category 214. The first category 222 may correspond to an exclusion category. For example, the exclusion category may include categories that are to be color distinct. That is, the color of an object categorized in the exclusion category should not be intentionally replicated in the original image 216 or serve as the color of the area 202. For example, the exclusion category may include people. If an object is categorized as being a person, the specific color of the person may be avoided as forming part of the area 202.

Another exclusion category may include color complementation. For example, some examples may identify the dominant color (e.g., yellow) 226 in the image 216 (e.g., during image recognition described above), and avoid complementary colors (e.g., green) to the dominant color. The dominant color 226 may be a most common color in the image 216, and/or serves as a focal point in the image 216. Thus, the third category 228 may include color complements to the dominant color 226. Avoiding modifications that result in unwanted and/or undesirable color contrasts between complementary and dominant colors may limit jarring or displeasing color combinations. In such cases, the area 202 may include colors from a same color family of the dominant color. Conventional examples may select complementary colors which results in sub-optimal performance.

In this example, the color selection process 200 adjusts a color of area 202 based on a determination that that no other color should match exclusion colors of the first and third categories 222, 228, 218. The adjustment may include increasing the contrast ratio between the text 204 and the area 202. The adjustment may also include avoiding any modification that would result in the text 204 or the area 202 coming within a color proximity of the first object 208 and/or the complementary colors of the third category 228. The color proximity may be measured through various metrics, such as distance or difference. For example, the distance (or difference) between two colors is a metric that quantifies how alike/unalike two colors are from each other. The distance may be a Euclidean distance measured between the color of the first object 208 and another portion of the original image 216, such as the area 202 and/or text 204. For example, if the Euclidean distance between the color of the first object 208 and a color of the area 202 is beneath a threshold, the color of the area 202 may be deemed to be too similar to the color of the first object 208 and the color of the area 202 may be adjusted to increase the distance to be above the threshold. Similarly, the color of the text 204 may be adjusted to avoid a situation where the color of the text 204 is too similar to the color of the first object 208. In some examples, proximity may be based on a characteristic of the color (e.g., hue values where close hue values indicate similar colors) which are then modified to avoid being proximate to exclusion colors. Similarly, colors of the text 204 and the area 202 may be adjusted to avoid being within a color proximity of the complementary colors of the third category 228.

Thus, the color selection process 200 adjusts the area 202 and/or the text 204 to increase the contrast ratio between the area 202 and/or the text 204 while ensuring that the area 202 and/or the text 204 have color(s) that are not within a color proximity of the first object 208 and the complementary colors of the third category 228. Notably, the color(s) of the area 202 and/or the text 204 may be within a color proximity of a color of the second object 210 since the second category 214 is not an exclusion category. The color selection process 200 therefore generates an adjusted image to include the original image 216, first object 208, second object 210, area 202 and text 204. An adjusted image 220 is thus generated.

FIGS. 5A, 5B, 5C and 5D illustrate conventional images 302, 312, 322, 332, and exemplary enhanced images 304, 314, 324, 334 according to some examples. The exemplary enhanced images 304, 314, 324, 334 may generally be implemented with the examples described herein, for example, the process 100 (FIG. 1), modification process 150 (FIG. 2), process 170 (FIG. 3) and/or color selection process 200 (FIG. 4), already discussed.

Figure 5A:
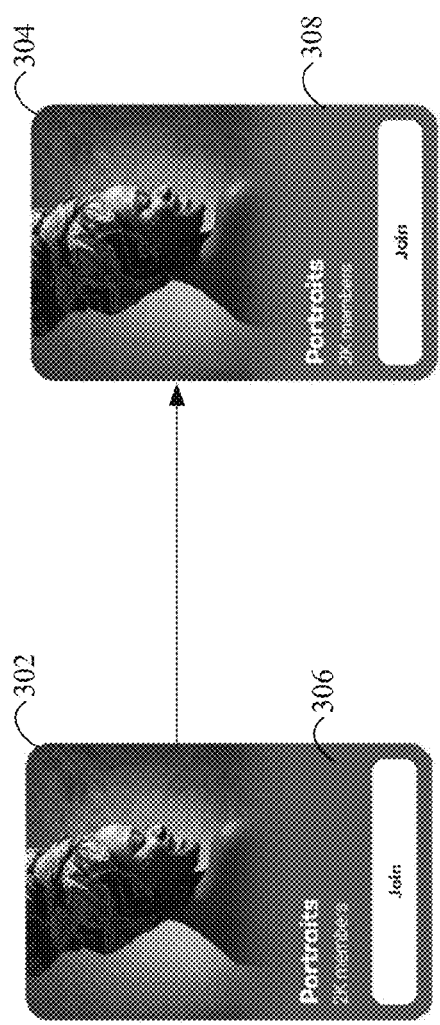

In FIG. 5A, a first conventional image 302 is generated by a conventional implementation. The first conventional image 302 includes a flesh-like colored area 306 with text. Examples as described herein however generate a first enhanced image 304, where the enhanced area 308 includes a green-like tone rather than a skin-colored tone.

Figure 5B:
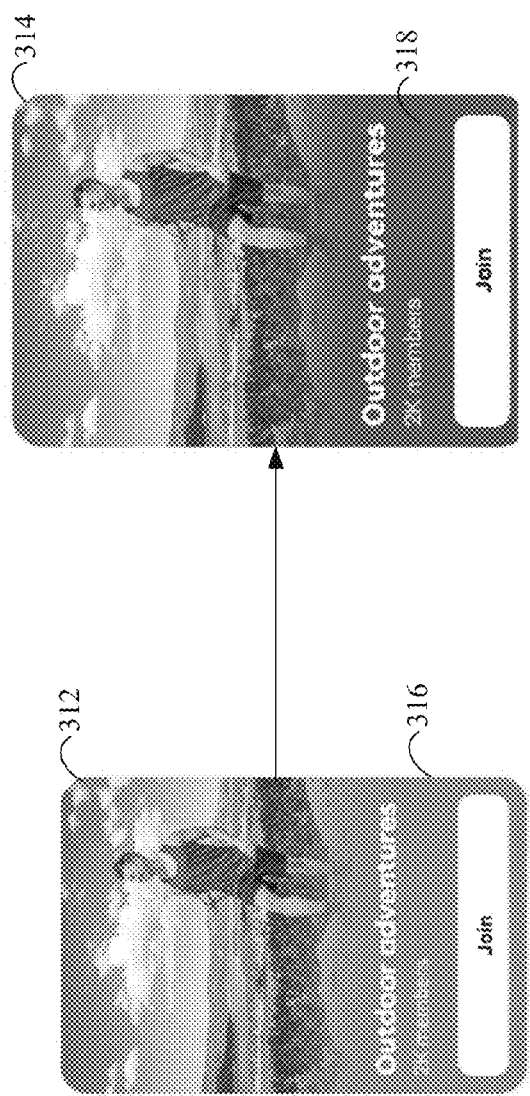

FIG. 5B illustrates a second conventional image 312 generated by a conventional implementation. The second conventional image 312 includes a poor visibility area 316 with text. That is, the contrast ratio in the poor visibility area 316 is too low for some users to comfortably read the text in the poor visibility area 316. Examples as described herein however generate a second enhanced image 314. An enhanced area 318 has a contrast ratio between the color of the text and underlying color of the enhanced area 318 that approaches and/or meets a threshold (e.g., 6.5).

FIG. 5C illustrates a third conventional image 322 generated by a conventional implementation that includes an inconsistent area 326 with text. That is, the shoes in the conventional image 322 comprise a color from the purple family, while the inconsistent area 326 comprises a color from the pink family, which is from a distinct color family than the purple family of the shoes.

Examples as described herein generate a third enhanced image 324. The third enhanced image 324 provides a consistent color tone extracted so that all colors belong within the same color family. Thus, rather than selecting a color (e.g., pink) that does not belong to the color family (e.g., purple) of the shoe as in the conventional image 322, examples as described herein select a color (e.g., dark purple) for enhanced area 328 that are from the same color family (e.g., purple family) as the shoes. Thus, some examples analyze the enhanced image 324 to identify colors in the enhanced image 324, identify a color family of the colors, and select the color for the enhanced area 328 to match the color family of the enhanced image 324. Some examples may further avoid selecting a color identical (or within some color proximity) of other colors in the enhanced image 324 for the enhanced area 328. Doing so avoids obscuring the focal points of the enhanced image 324 and facilitating image recognition by users. For example, doing so avoids an image where important objects are not easily differentiated from the color of the enhanced area 328.

FIG. 5D illustrates a fourth conventional image 332 generated by a conventional implementation. The fourth conventional image 332 includes an unattractive area 336 with text. That is, the unattractive area 336 may include an unattractive muddy brown color. Examples as described herein may include an exclusion list that excludes certain unattractive colors (e.g., "muddy browns," "puke yellow" and "puke green") from being utilized. Thus, examples as described herein generate enhanced image 334 that generates visually pleasing colors as part of the enhanced area 338. Notably, the enhanced area 338 is more attractive than the conventional area 336.

Figure 6A:
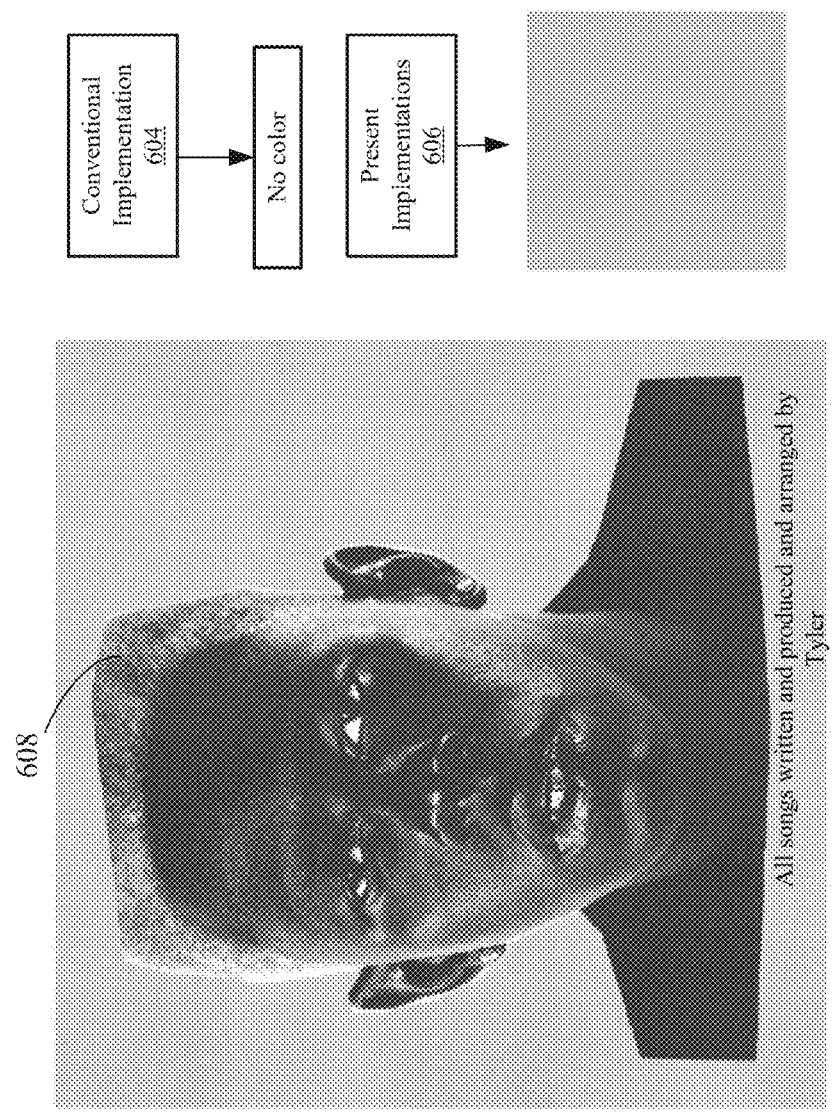
FIGS. 6A, 6B, 6C illustrate examples of background color selections by conventional implementations and present implementations according to examples of the disclosure.
Figure 6B:
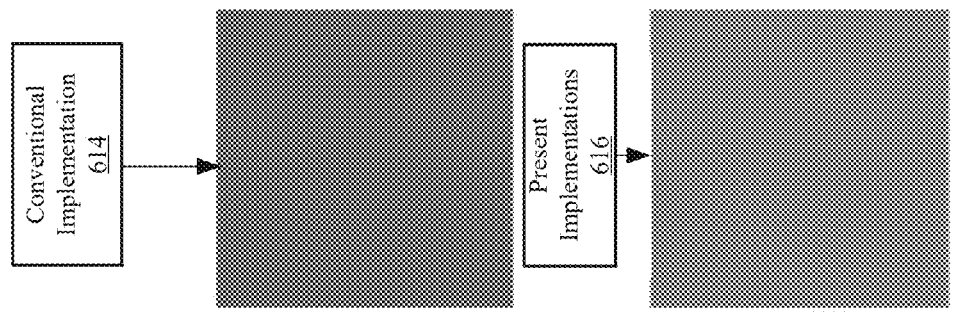
Figure 6B:
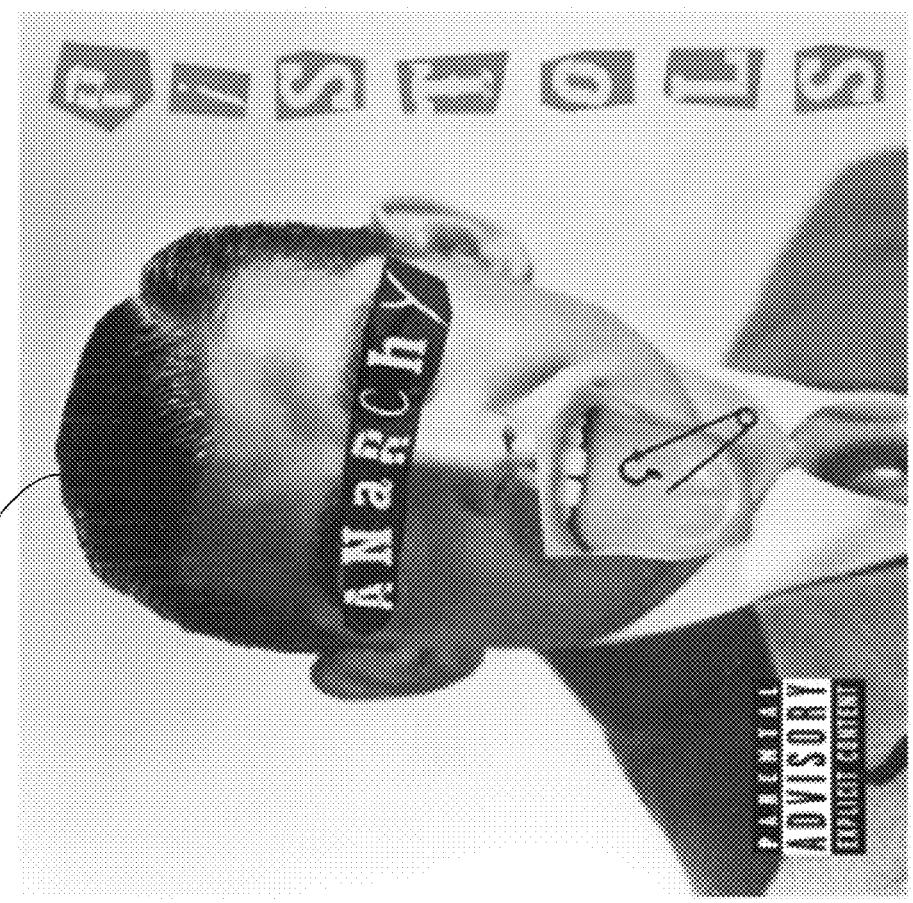
Figure 6C:
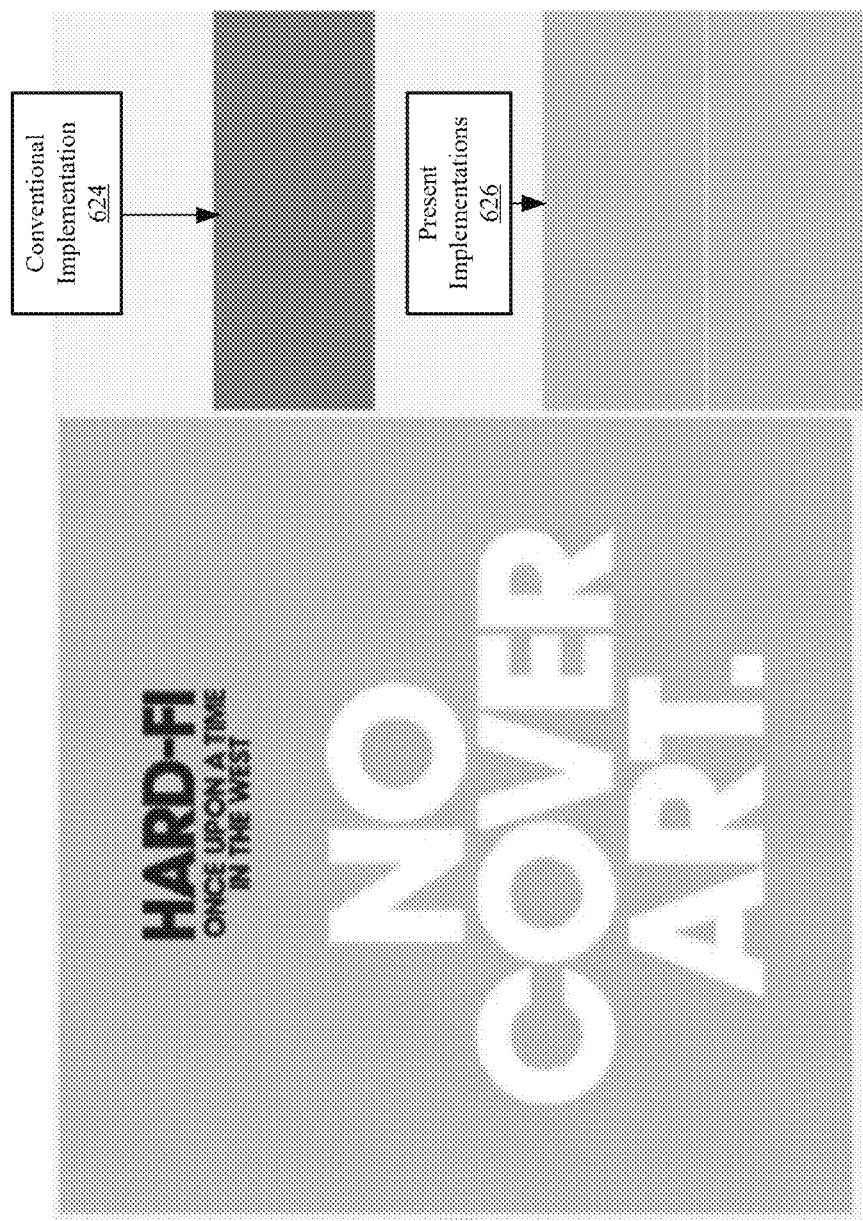

FIGS. 6A, 6B, 6C illustrate background color selections by conventional implementations 604, 614, 624, and present implementations 606, 616, 626. The present implementations 606, 616, 626 may generally be implemented with the examples described herein, for example, the process 100 (FIG. 1), modification process 150 (FIG. 2), process 170 (FIG. 3), color selection process 200 (FIG. 4) and/or exemplary enhanced images 304, 314, 324, 334 (FIGS. 5A-5D) already discussed.

FIG. 6A illustrates a first image 598 that comprises a person 608. Conventional implementation 604 is unable to select an appropriate background color for the person 608 and the associated text image to meet accessibility standards (e.g., achieve a 6.5 contrast ratio between the background and text). In part, such conventional implementations including the conventional implementation 604 operate in less efficient color spaces (e.g., sRGB or cyan, magenta, yellow, and key (CMYK) color space) which limits the colors available for contrast. Present implementations 606 however may select the pink color which achieves the desired accessibility standard at 6.5 contrast ratio between the text and background.

FIG. 6B illustrates a second image 618 that includes a person 612. A conventional implementation 614 selects a muddy brown color for the background of the text which is unattractive. In contrast, the present implementation 616 selects a more attractive pink color for the background of the text to create a more pleasing view and to meet accessibility standards.

FIG. 6C illustrates a third image 620 that includes text. A conventional implementation 624 selects a complementary green color for the background of the text which is undesirable as doing so creates a jarring visual display. In contrast, the present implementation 626 selects the dominant color (i.e., yellow) for the background of the text to create a more pleasing view that avoids sudden color changes and meets accessibility standards.

Figure 8:
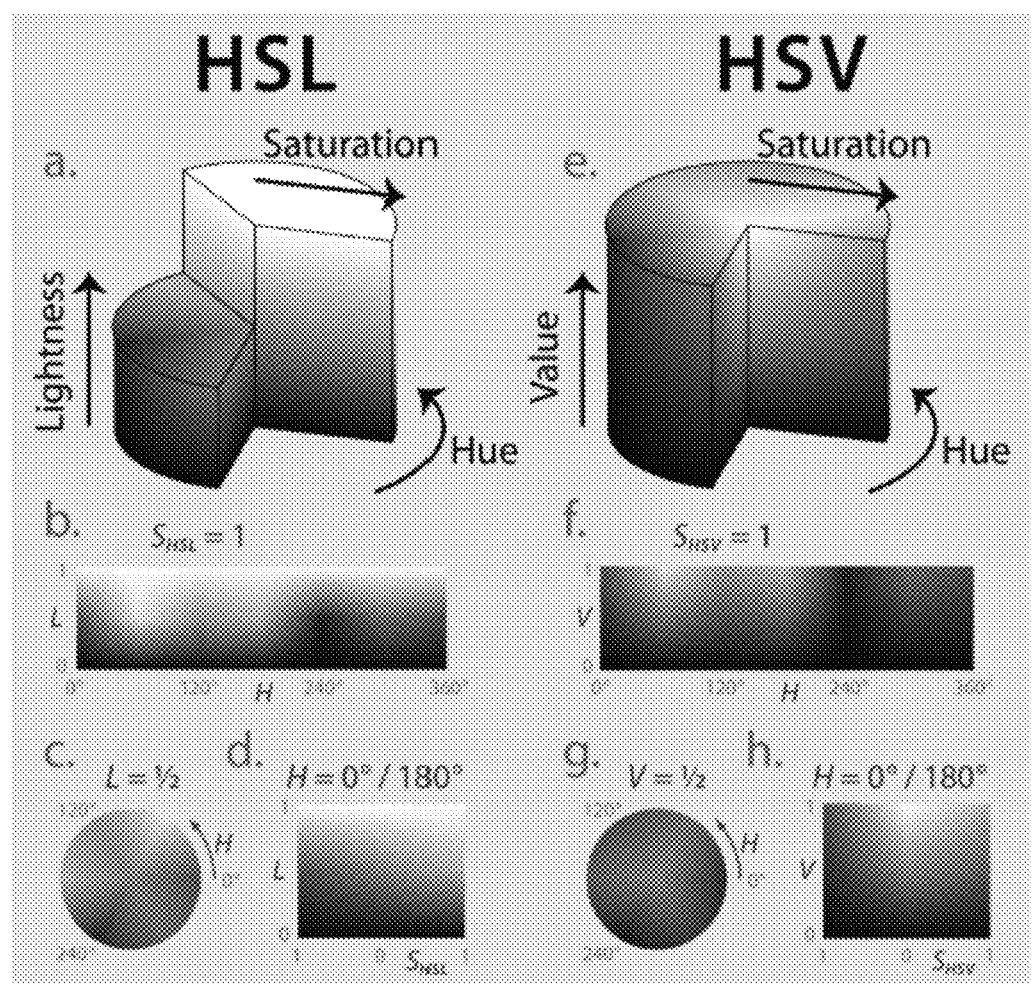
FIG. 8 illustrates an example of different color spaces according to examples of the disclosure.
Figure 8:
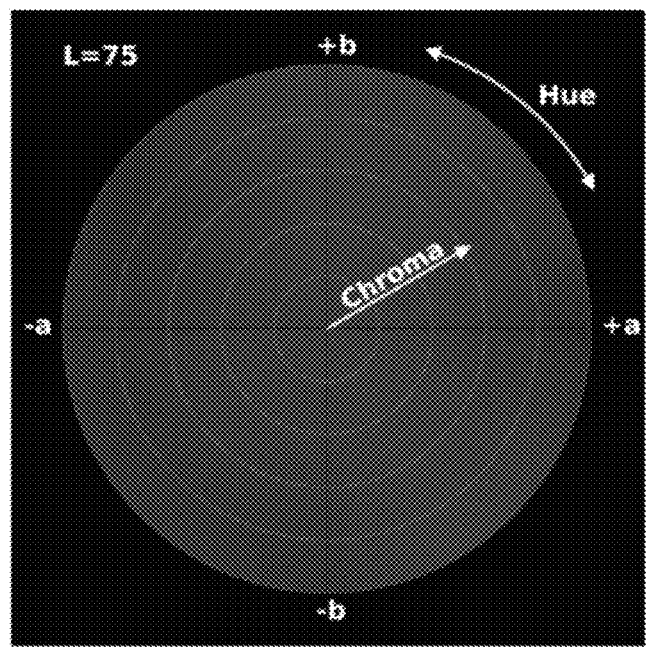

FIG. 8 illustrates an HSL color space 680. Furthermore, a HSV color space 682 is illustrated. An LCH color space 684 is also illustrated.

Figure 9:
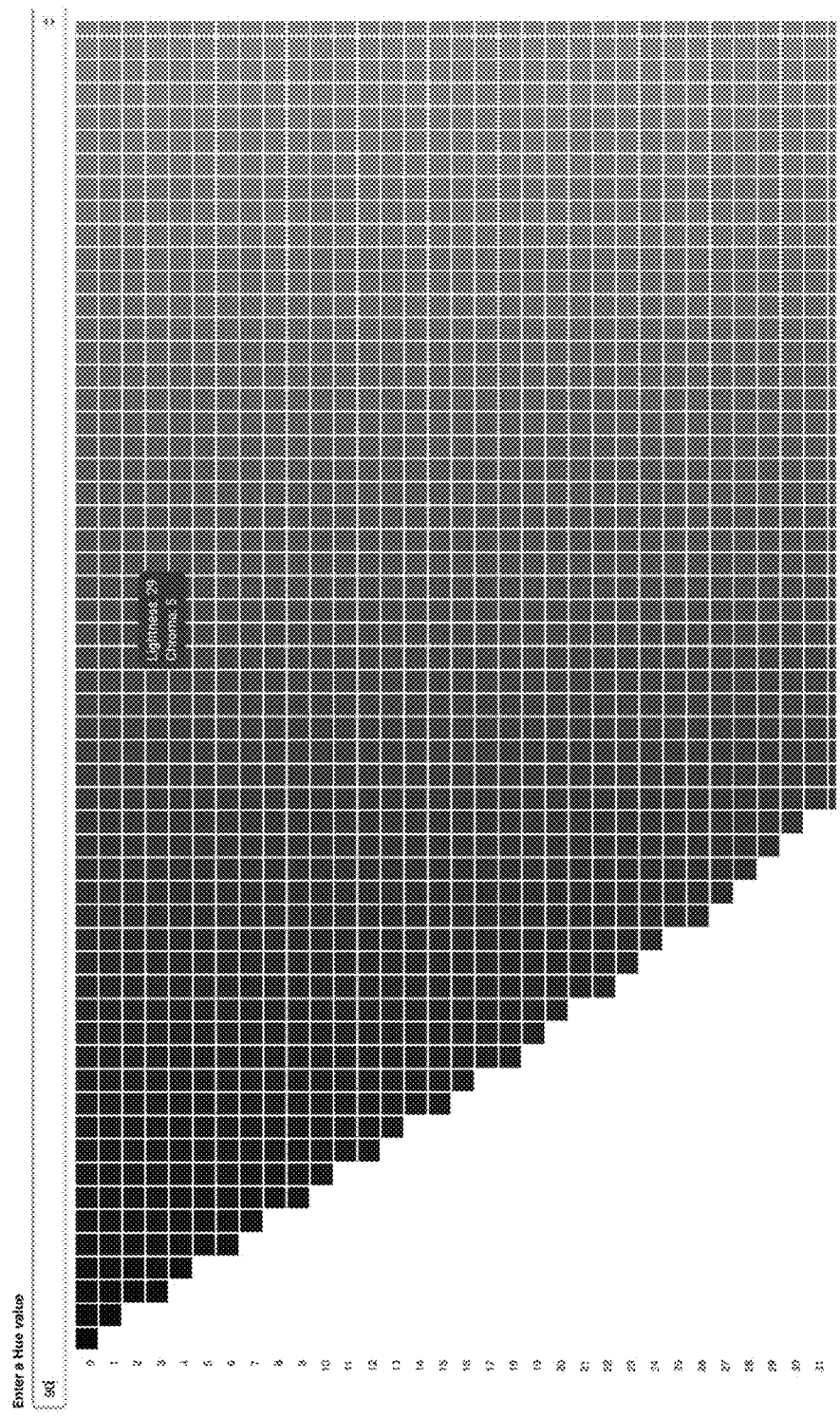
FIG. 9 illustrates an example of a color graph according to examples of the disclosure.

FIG. 9 illustrates a graph 700 of various colors in an HCL color space. In detail, a hue of 90 is mapped to varying lightness and chroma values. Appropriate colors to place in an exclusion list (either automated or manually) may be selected based on the graph 700. Similarly, other hue values may be mapped to various lightness and chroma values to be analyzed for exclusion colors.

Figure 10:
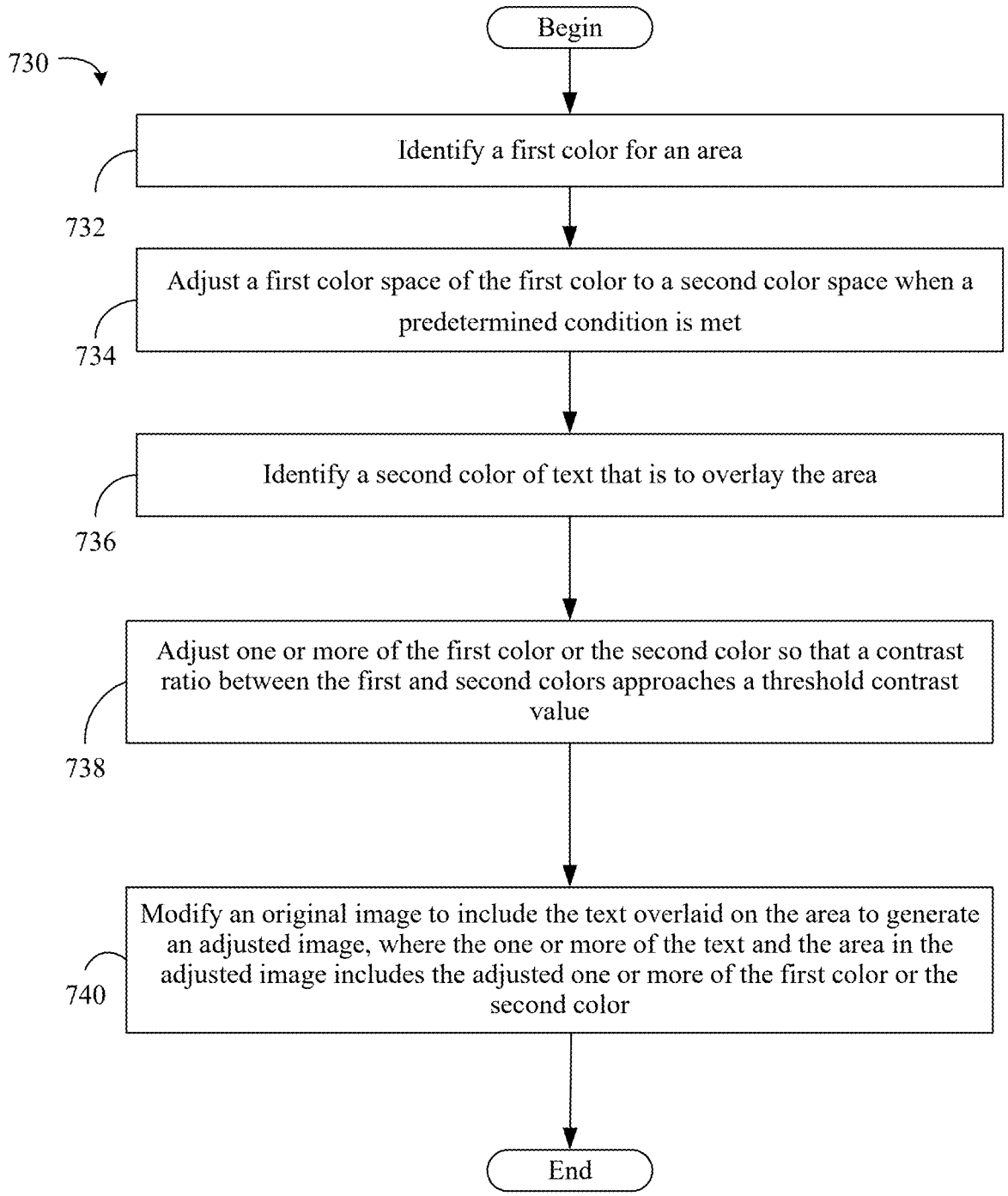
FIG. 10 is a flowchart of an example of a method of generating background colors for an image according to an example of the disclosure.

FIG. 10 illustrates a method 730 to generate background colors for an image. One or more aspects of method 730 may be implemented as part of and/or in conjunction the process 100 (FIG. 1), modification process 150 (FIG. 2), process 170 (FIG. 3), color selection process 200 (FIG. 4), exemplary enhanced images 304, 314, 324, 334 (FIGS. 5A-5D) and/or present implementations 606, 616, 626 (FIGS. 6A-6C), color spaces 690 (FIG. 7A), second portion 656 of the image 658 (FIG. 7B) and/or HSL color space 680, HSV color space 682 and LCH color space 684 (FIG. 8) is already discussed. Method 730 may be implemented in a computing device, computing system (e.g., hardware, configurable logic, fixed-function logic hardware, at least one computer readable storage medium comprising a set of instructions for execution, etc.).

Illustrated processing block 732 identifies a first color for an area. Illustrated processing block 734 adjusts a first color space of the first color to a second color space when a predetermined condition is met. Illustrated processing block 736 identifies a second color of text that is to overlay the area. Illustrated processing block 738 adjusts one or more of the first color or the second color so that a contrast ratio between the first and second colors approaches a threshold contrast value. Illustrated processing block 740 modifies an original image to include the text overlaid on the area to generate an adjusted image, where the one or more of the text and the area in the adjusted image includes the adjusted one or more of the first color or the second color.

In some examples, the method 730 identifies the first color based on the original image. In some examples, the method 730 transforms the first color from the first color space to the second color space based on the predetermined condition being met. In such examples, the second color space is a L*a*b* color space or a Hue-Chroma-Lightness (HCL) color space, and the method 730 adjusts the one or more of the first color or the second color, the set of instruction by adjusting a lightness of the first color until the contrast ratio is met.

In some examples, the method 730 adjusts the one or more of the first color or the second color by identifying an exclusion list of colors that are to be excluded, identifying that a first adjustment to the one or more of the first color or the second color would result in the one or more of the first color or the second color matching a color of the exclusion list and discards the first adjustment. In such examples, the method 730 identifies that a second adjustment to the one or more of the first color or the second color would result in the one or more of the first color or the second color not matching any color in the exclusion list, and implements the second adjustment to adjust the one or more of the first color or the second color.

In some examples, the method 730 identifies an object from the original image, wherein the object is associated with a third color, and categorizes the object as being in an exclusion category, determines that the third color is to be a solitary color based on the object being classified into the exclusion category. In such examples, the method 730 adjusts the one or more of the first color or the second color causes the computing device to avoid adjusting the one or more of the first color or the second color to be within a color proximity of the third color.

In some examples, the method 730 identifies a third color in the adjusted image as being a dominant color. To adjust the one or more of the first color or the second color, the method 730 adjusts the one or more of the first color or the second color to be within a same color family as the third color based on the third color being the dominant color.

System Overview

Figure 11:
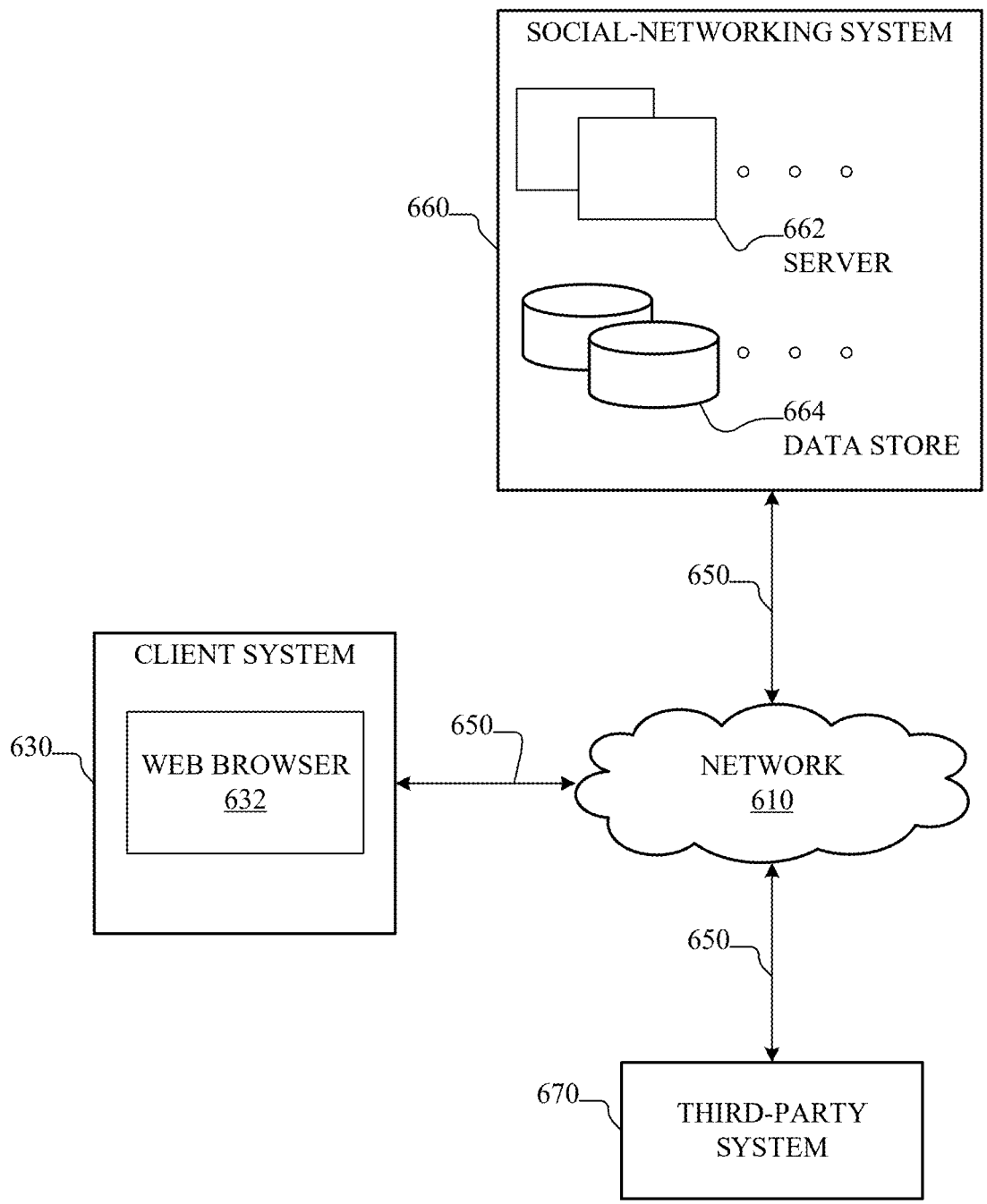
FIG. 11 illustrates an example network environment associated with a social-networking system according to an example of the disclosure.

FIG. 11 illustrates an example network environment 600 associated with a social-networking system. Network environment 600 may implement one or more aspects of the process 100 (FIG. 1), modification process 150 (FIG. 2), process 170 (FIG. 3), color selection process 200 (FIG. 4), exemplary enhanced images 304, 314, 324, 334 (FIGS. 5A-5D), present implementations 606, 616, 626 (FIGS. 6A-6C) and/or method 730 (FIG. 10) already discussed.

Network environment 600 includes a client system 630, a social-networking system 660, and a third-party system 670 connected to each other by a network 610. Although FIG. 11 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 11 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular examples, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular examples, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular examples, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular examples, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular examples, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular examples, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular examples, each server 662 may include hardware, software, or embedded logic components or a combination of two or more such components for carrying out the appropriate functionalities implemented or supported by server 662. In particular examples, social-networking system 660 may include one or more data stores 664. Data stores 664 may be used to store various types of information. In particular examples, the information stored in data stores 664 may be organized according to specific data structures. In particular examples, each data store 664 may be a relational, columnar, correlation, or other suitable database. Although this disclosure describes or illustrates particular types of databases, this disclosure contemplates any suitable types of databases. Particular examples may provide interfaces that enable a client system 630, a social-networking system 660, or a third-party system 670 to manage, retrieve, modify, add, or delete, the information stored in data store 664.

In particular examples, social-networking system 660 may store one or more social graphs in one or more data stores 664. In particular examples, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular examples, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular examples, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular examples, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular examples, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular examples, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular examples, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular examples, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular examples, social-networking system 660 may include a variety of servers, sub-systems, programs, modules, logs, and data stores. In particular examples, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular examples, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Social Graphs

Figure 12:
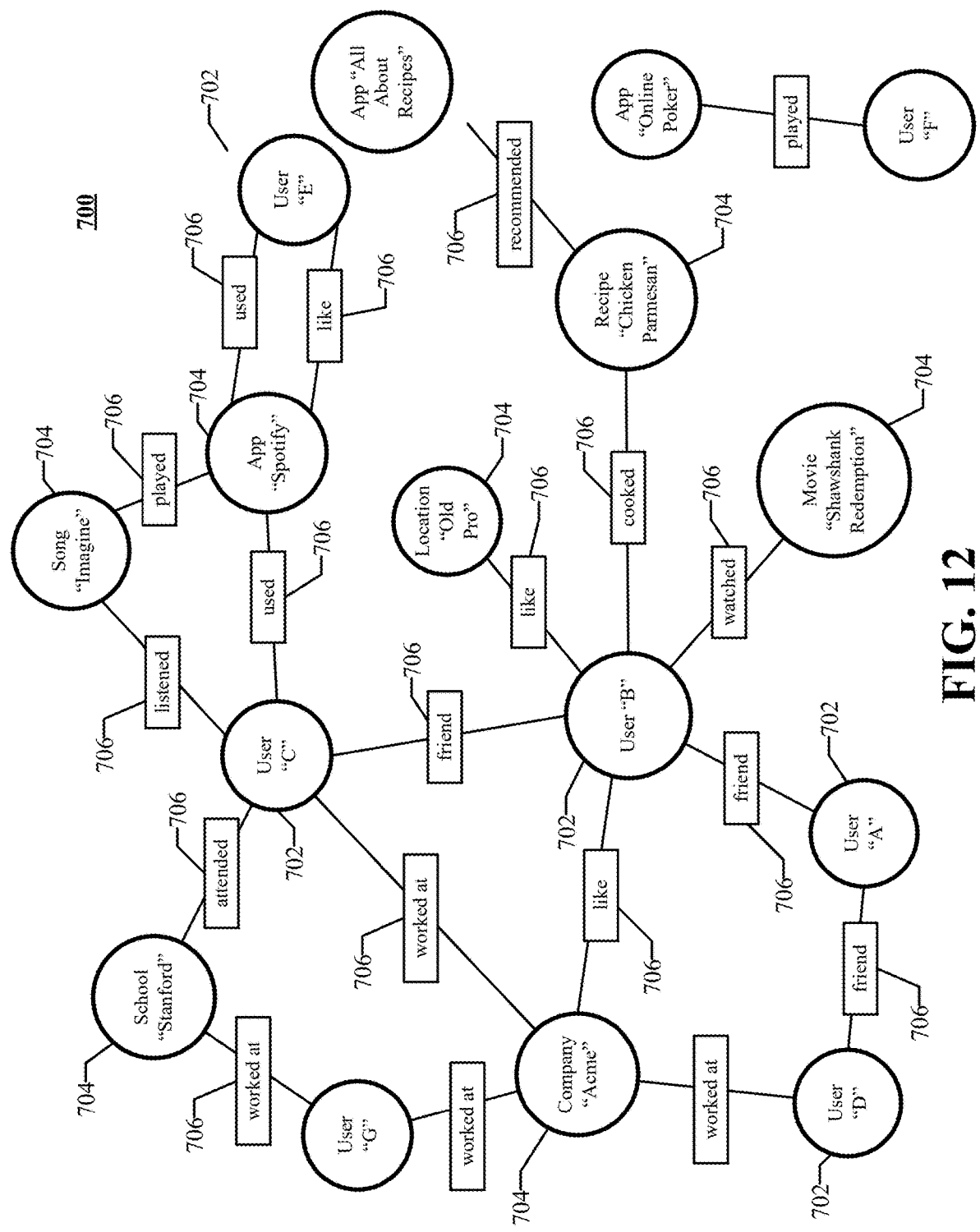
FIG. 12 illustrates an example social graph according to an example of the disclosure.

FIG. 12 illustrates example social graph 700. In some examples, the process 100 (FIG. 1), modification process 150 (FIG. 2), process 170 (FIG. 3), color selection process 200 (FIG. 4), exemplary enhanced images 304, 314, 324, 334 (FIGS. 5A-5D), present implementations 606, 616, 626 (FIGS. 6A-6C) and/or method 730 (FIG. 10) already discussed may access social graph 700 to implement one or more aspects.

In particular examples, social-networking system 660 may store one or more social graphs 700 in one or more data stores. In particular examples, social graph 700 may include multiple nodes—which may include multiple user nodes 702 or multiple concept nodes 704—and multiple edges 706 connecting the nodes. Each node may be associated with a unique entity (i.e., user or concept), each of which may have a unique identifier (ID), such as a unique number or username. Example social graph 700 illustrated in FIG. 12 is shown, for didactic purposes, in a two-dimensional visual map representation. In particular examples, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular examples, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular examples, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular examples, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular examples, a user node 702 may be associated with one or more data objects corresponding to information associated with a user. In particular examples, a user node 702 may correspond to one or more webpages.

In particular examples, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular examples, a concept node 704 may be associated with one or more data objects corresponding to information associated with concept node 704. In particular examples, a concept node 704 may correspond to one or more webpages.

In particular examples, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular examples, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular examples, a pair of nodes in social graph 700 may be connected to each other by one or more edges 706. An edge 706 connecting a pair of nodes may represent a relationship between the pair of nodes. In particular examples, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 12, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706. The degree of separation between two objects represented by two nodes, respectively, is a count of edges in a shortest path connecting the two nodes in the social graph 700. As an example and not by way of limitation, in the social graph 700, the user node 702 of user "C" is connected to the user node 702 of user "A" via multiple paths including, for example, a first path directly passing through the user node 702 of user "B," a second path passing through the concept node 704 of company "Acme" and the user node 702 of user "D," and a third path passing through the user nodes 702 and concept nodes 704 representing school "Stanford," user "G," company "Acme," and user "D." User "C" and user "A" have a degree of separation of two because the shortest path connecting their corresponding nodes (i.e., the first path) includes two edges 706.

In particular examples, an edge 706 between a user node 702 and a concept node 704 may represent a particular action or activity performed by a user associated with user node 702 toward a concept associated with a concept node 704. As an example and not by way of limitation, as illustrated in FIG. 12, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 660 may create a "listened" edge 706 and a "used" edge (as illustrated in FIG. 11) between user nodes 702 corresponding to the user and concept nodes 704 corresponding to the song and application to indicate that the user listened to the song and used the application. Moreover, social-networking system 660 may create a "played" edge 706 (as illustrated in FIG. 11) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 12 between user node 702 for user "E" and concept node 704 for "SPOTIFY").

In particular examples, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704. In particular examples, social-networking system 660 may store an edge 706 in one or more data stores. In particular examples, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Social Graph Affinity and Coefficient

In particular examples, social-networking system 660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular examples, social-networking system 660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular examples, social-networking system 660 may use a variety of factors to calculate a coefficient. These factors may include, for example, user actions, types of relationships between objects, location information, other suitable factors, or any combination thereof. In particular examples, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular examples, the social-networking system 660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular examples, social-networking system 660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular examples, social-networking system 660 may calculate a coefficient based on a user's actions. Social-networking system 660 may monitor such actions on the online social network, on a third-party system 670, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular examples, social-networking system 660 may calculate a coefficient based on the user's actions with particular types of content. The content may be associated with the online social network, a third-party system 670, or another suitable system. The content may include users, profile pages, posts, news stories, headlines, instant messages, chat room conversations, emails, advertisements, pictures, video, music, other suitable objects, or any combination thereof. Social-networking system 660 may analyze a user's actions to determine whether one or more of the actions indicate an affinity for subject matter, content, other users, and so forth. As an example and not by way of limitation, if a user frequently posts content related to "coffee" or variants thereof, social-networking system 660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular examples, social-networking system 660 may calculate a coefficient based on the type of relationship between particular objects. Referencing the social graph 700, social-networking system 660 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than user nodes 702 that are connected by a friend-type edge. In other words, depending upon the weights assigned to the actions and relationships for the particular user, the overall affinity may be determined to be higher for content about the user's spouse than for content about the user's friend. In particular examples, the relationships a user has with another object may affect the weights and/or the ratings of the user's actions with respect to calculating the coefficient for that object. As an example and not by way of limitation, if a user is tagged in a first photo, but merely likes a second photo, social-networking system 660 may determine that the user has a higher coefficient with respect to the first photo than the second photo because having a tagged-in-type relationship with content may be assigned a higher weight and/or rating than having a like-type relationship with content. In particular examples, social-networking system 660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 660 may determine that the first user should also have a relatively high coefficient for the particular object. In particular examples, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular examples, social-networking system 660 may calculate a coefficient based on location information. Objects that are geographically closer to each other may be considered to be more related or of more interest to each other than more distant objects. In particular examples, the coefficient of a user towards a particular object may be based on the proximity of the object's location to a current location associated with the user (or the location of a client system 630 of the user). A first user may be more interested in other users or concepts that are closer to the first user. As an example and not by way of limitation, if a user is one mile from an airport and two miles from a gas station, social-networking system 660 may determine that the user has a higher coefficient for the airport than the gas station based on the proximity of the airport to the user.

In particular examples, social-networking system 660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 660 may provide information that is relevant to user's interests and current circumstances, increasing the likelihood that they will find such information of interest. In particular examples, social-networking system 660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular examples, social-networking system 660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular examples, social-networking system 660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 670 (e.g., via an API or other communication channel), or from another suitable system. In response to the request, social-networking system 660 may calculate the coefficient (or access the coefficient information if it has previously been calculated and stored). In particular examples, social-networking system 660 may measure an affinity with respect to a particular process. Different processes (both internal and external to the online social network) may request a coefficient for a particular object or set of objects. Social-networking system 660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular examples may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular examples, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular examples, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular examples, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular examples, privacy settings may allow users to opt in or opt out of having their actions logged by social-networking system 660 or shared with other systems (e.g., third-party system 670). In particular examples, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 670, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular examples, one or more servers 662 may be authorization/privacy servers for enforcing privacy settings. In response to a request from a user (or other entity) for a particular object stored in a data store 664, social-networking system 660 may send a request to the data store 664 for the object. The request may identify the user associated with the request and may only be sent to the user (or a client system 630 of the user) if the authorization server determines that the user is authorized to access the object based on the privacy settings associated with the object. If the requesting user is not authorized to access the object, the authorization server may prevent the requested object from being retrieved from the data store 664, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 13:
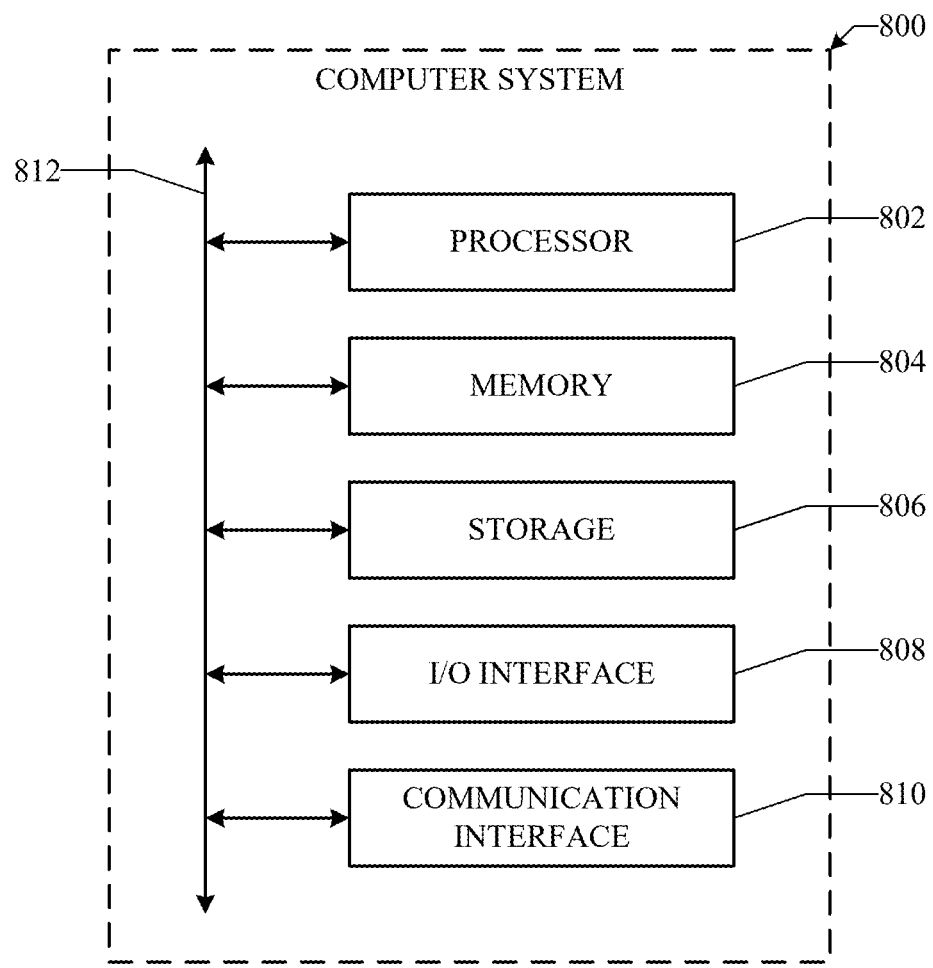
FIG. 13 illustrates an example computer system according to an example of the disclosure.

FIG. 13 illustrates an example computer system 800. The system 800 may implement one or more aspects of the process 100 (FIG. 1), modification process 150 (FIG. 2), process 170 (FIG. 3), color selection process 200 (FIG. 4), exemplary enhanced images 304, 314, 324, 334 (FIGS. 5A-5D), present implementations 606, 616, 626 (FIGS.

6A-6C) and/or method 730 (FIG. 10) already discussed. In particular examples, one or more computer systems 800 perform one or more steps of one or more methods described or illustrated herein. In particular examples, one or more computer systems 800 provide functionality described or illustrated herein. In particular examples, software running on one or more computer systems 800 performs one or more steps of one or more methods described or illustrated herein or provides functionality described or illustrated herein. Particular examples include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular examples, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular examples, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular examples, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular examples, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular examples, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular examples, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular examples, one or more memory management units (MMUs) reside between processor 802 and memory 804 and facilitate accesses to memory 804 requested by processor 802. In particular examples, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular examples, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular examples, storage 806 is non-volatile, solid-state memory. In particular examples, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular examples, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular examples, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular examples, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Thus, technology described herein may support a granular image enhancement selection process. The technology may substantially reduce the memory needed to store listings, the time needed to consummate a transaction and preserve valuable compute resources as well as bandwidth.

Examples are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary examples to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although examples are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the examples. Further, arrangements may be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. Where specific details (e.g., circuits) are set forth in order to describe example examples, it should be apparent to one skilled in the art that examples can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

We claim:

1. At least one computer readable storage medium comprising a set of instructions, which when executed by a computing device, cause the computing device to:
   identify a first color for an area;
   adjust a first color space of the first color to a second color space when a predetermined condition is met;
   identify a second color of at least text that is to overlay the area;
   adjust one or more of the first color or the second color so that a contrast ratio between the first and second colors approaches a threshold contrast value;
   modify an original image to include the text overlaid on the area to generate an adjusted image, wherein the one or more of the text and the area in the adjusted image includes the adjusted one or more of the first color or the second color; and
   identify a third color in the adjusted image as being a dominant color, wherein the adjusted one or more of the first color or the second color is within a same color family as the third color based on the third color being the dominant color.

2. The at least one computer readable storage medium of claim 1, wherein the instructions, when executed, cause the computing device to:
   identify the first color based on the original image.

3. The at least one computer readable storage medium of claim 1, wherein the instructions, when executed, cause the computing device to:
   determine that the predetermined condition is met; and
   transform the first color from the first color space to the second color space based on the predetermined condition being met.

4. The at least one computer readable storage medium of claim 3, wherein the second color space is a L*a*b* color space or a Hue-Chroma-Lightness (HCL) color space, and
   further wherein to adjust the one or more of the first color or the second color, the set of instructions, which when executed by the computing device, cause the computing device to adjust a lightness of the first color until the contrast ratio is met.

5. The at least one computer readable storage medium of claim 1, further wherein to adjust the one or more of the first color or the second color, the set of instructions, which when executed by the computing device, cause the computing device to:
   identify an exclusion list of colors that are to be excluded;
   identify that a first adjustment to the one or more of the first color or the second color would result in the one or more of the first color or the second color matching a color of the exclusion list;
   discard the first adjustment;
   identify that a second adjustment to the one or more of the first color or the second color would result in the one or more of the first color or the second color not matching any color in the exclusion list; and
   implement the second adjustment to adjust the one or more of the first color or the second color.

6. The at least one computer readable storage medium of claim 1, wherein the set of instructions, which when executed by the computing device, cause the computing device to:
   identify an object from the original image, wherein the object is associated a third color;
   categorize the object as being in an exclusion category; and
   determine that the third color is to be a solitary color based on the object being classified into the exclusion category;
   further wherein to adjust the one or more of the first color or the second color, the set of instructions, which when executed by the computing device, cause the computing device to avoid adjusting the one or more of the first color or the second color to be within a color proximity of the third color.

7. A system comprising:
   one or more processors; and
   a memory coupled to the one or more processors, the memory comprising instructions executable by the one or more processors, the one or more processors being operable when executing the instructions to:
   identify a first color for an area,
   adjust a first color space of the first color to a second color space when a predetermined condition is met,
   identify a second color of at least text that is to overlay the area,
   adjust one or more of the first color or the second color so that a contrast ratio between the first and second colors approaches a threshold contrast value, wherein the one or more of the first color or the second color is adjusted by:
   identifying an exclusion list of colors that are to be excluded;
   identifying that a first adjustment to the one or more of the first color or the second color would result in the one or more of the first color or the second color matching a color of the exclusion list;

discarding the first adjustment;

identifying that a second adjustment to the one or more of the first color or the second color would result in the one or more of the first color or the second color not matching any color in the exclusion list; and implement the second adjustment to adjust the one or more of the first color or the second color; and modify an original image to include the text overlaid on the area to generate an adjusted image, wherein the one or more of the text and the area in the adjusted image includes the adjusted one or more of the first color or the second color.

8. The system of claim 7, wherein the one or more processors are further operable when executing the instructions to:

identify the first color based on the original image.

9. The system of claim 7, wherein the one or more processors are further operable when executing the instructions to:

determine that the predetermined condition is met; and transform the first color from the first color space to the second color space based on the predetermined condition being met.

10. The system of claim 9, wherein the second color space is a L*a*b* color space or a Hue-Chroma-Lightness (HCL) color space, and further wherein to adjust the one or more of the first color or the second color, the one or more processors are further operable when executing the instructions to adjust a lightness of the first color until the contrast ratio is met.

11. The system of claim 7, wherein the one or more processors are further operable when executing the instructions to:

identify an object from the original image, wherein the object is associated a third color;

categorize the object as being in an exclusion category; and determine that the third color is to be a solitary color based on the object being classified into the exclusion category;

further wherein to adjust the one or more of the first color or the second color, the one or more processors being operable when executing the instructions to avoid adjusting the one or more of the first color or the second color to be within a color proximity of the third color.

12. The system of claim 7, wherein the one or more processors are further operable when executing the instructions to:

identify a third color in the adjusted image as being a dominant color; and further wherein to adjust the one or more of the first color or the second color, the one or more processors being operable when executing the instructions to adjust the one or more of the first color or the second color to be within a same color family as the third color based on the third color being the dominant color.

13. A method comprising:

identifying a first color for an area;

adjusting a first color space of the first color to a second color space when a predetermined condition is met;

identifying a second color of at least text that is to overlay the area, wherein the second color space is a L*a*b* color space or a Hue-Chroma-Lightness (HCL) color space;

transforming the first color from the first color space to the second color space based on the predetermined condition being met;

adjusting one or more of the first color or the second color so that a contrast ratio between the first and second colors approaches a threshold contrast value;

adjusting a lightness of the first color until the contrast ratio is met; and modifying an original image to include the text overlaid on the area to generate an adjusted image, wherein the one or more of the text and the area in the adjusted image includes the adjusted one or more of the first color or the second color.

14. The method of claim 13, further comprising:

identifying the first color based on the original image.

15. The method of claim 13, further wherein the adjusting the one or more of the first color or the second color includes:

identifying an exclusion list of colors that are to be excluded;

identifying that a first adjustment to the one or more of the first color or the second color would result in the one or more of the first color or the second color matching a color of the exclusion list;

discarding the first adjustment;

identifying that a second adjustment to the one or more of the first color or the second color would result in the one or more of the first color or the second color not matching any color in the exclusion list; and implementing the second adjustment to adjust the one or more of the first color or the second color.

16. The method of claim 13, further comprising:

identifying an object from the original image, wherein the object is associated a third color;

categorizing the object as being in an exclusion category; and determining that the third color is to be a solitary color based on the object being classified into the exclusion category;

further wherein the adjusting the one or more of the first color or the second color includes avoiding adjusting the one or more of the first color or the second color to be within a color proximity of the third color.

* * * * *